United States Patent
Jo et al.

(10) Patent No.: US 10,959,219 B2
(45) Date of Patent: Mar. 23, 2021

(54) METHOD FOR RECEIVING DOWNLINK CONTROL CHANNEL IN WIRELESS COMMUNICATION SYSTEM AND DEVICE THEREFOR

(71) Applicant: LG ELECTRONICS INC., Seoul (KR)

(72) Inventors: Soonki Jo, Seoul (KR); Yunjung Yi, Seoul (KR); Inkwon Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/484,095

(22) PCT Filed: Feb. 6, 2018

(86) PCT No.: PCT/KR2018/001587
§ 371 (c)(1),
(2) Date: Aug. 6, 2019

(87) PCT Pub. No.: WO2018/143777
PCT Pub. Date: Aug. 9, 2018

(65) Prior Publication Data
US 2020/0008180 A1 Jan. 2, 2020

Related U.S. Application Data

(60) Provisional application No. 62/454,953, filed on Feb. 6, 2017, provisional application No. 62/476,706, filed
(Continued)

(51) Int. Cl.
*H04W 72/04* (2009.01)
*H04L 5/00* (2006.01)
*H04L 27/26* (2006.01)

(52) U.S. Cl.
CPC ........ *H04W 72/042* (2013.01); *H04L 5/0007* (2013.01); *H04L 5/0053* (2013.01); *H04L 27/2649* (2013.01); *H04L 27/2676* (2013.01)

(58) Field of Classification Search
CPC ... H04L 1/0046; H04L 1/0057; H04L 5/0053; H04L 5/0094; H04L 27/2602;
(Continued)

(56) References Cited

U.S. PATENT DOCUMENTS

| | | | |
|---|---|---|---|
| 2013/0163543 A1* | 6/2013 | Freda | H04W 16/14 370/329 |
| 2018/0007664 A1* | 1/2018 | Gho | H04W 72/042 |
| 2018/0167959 A1* | 6/2018 | Liao | H04W 72/042 |

OTHER PUBLICATIONS

PCT International Application No. PCT/KR2018/001587, Written Opinion of the International Searching Authority dated May 23, 2018, 21 pages.
(Continued)

*Primary Examiner* — Harun Chowdhury
(74) *Attorney, Agent, or Firm* — Lee, Hong, Degerman, Kang & Waimey

(57) ABSTRACT

The present invention discloses a method and device for receiving a downlink control channel according to various embodiments. A method and device are disclosed, the method for receiving a downlink control channel according to an aspect of the present invention includes: a step for receiving a subframe including a downlink control region; and a step for performing blind decoding on a search space in the downlink control region, wherein the search space includes a plurality of PDCCH candidates which correspond to respective aggregation levels and include control channel elements (CCEs), and each of the plurality of PDCCH candidates overlaps at least one PDCCH candidate.

13 Claims, 29 Drawing Sheets

Related U.S. Application Data on Mar. 24, 2017, provisional application No. 62/507,729, filed on May 17, 2017, provisional application No. 62/520,445, filed on Jun. 15, 2017, provisional application No. 62/539,501, filed on Jul. 31, 2017, provisional application No. 62/557,134, filed on Sep. 11, 2017, provisional application No. 62/567,185, filed on Oct. 2, 2017.

(58) Field of Classification Search
CPC ... H04L 27/2676; H04L 5/0007; H04L 5/001; H04L 27/2649; H04W 16/14; H04W 72/0406; H04W 72/042
USPC .................................. 370/329, 330, 431, 252
See application file for complete search history.

(56) References Cited

OTHER PUBLICATIONS

Mediatek, "On Dynamic Switching between Single & Aggregated DCI", 3GPP TSG RAN WG1 AH NR Meeting, R1-1700153, Jan. 2017, 3 pages.

Nokia, et al., "Correction on PDCCH candidate configuration", 3GPP TSG RAN WG1 Meeting #86bis, R1-1611074, Oct. 2016, 4 pages.

Etri, "Discussion on control resource set and DMRS for DL control channel", 3GPP TSG RAN WG1 NR Ad-Hoc Meeting, R1-1700581, Jan. 2017, 5 pages.

Ntt Docomo, "Monitoring of DL control channel for NR", 3GPP TSG RAN WG1 AH NR Meeting, R1-1700620, Jan. 2017, 8 pages.

Nokia, et al., "On the PDCCH search space structure for NR", 3GPP TSG RAN WG1 NR Meeting, R1-1701011, Jan. 2017, 3 pages.

* cited by examiner

FIG. 2
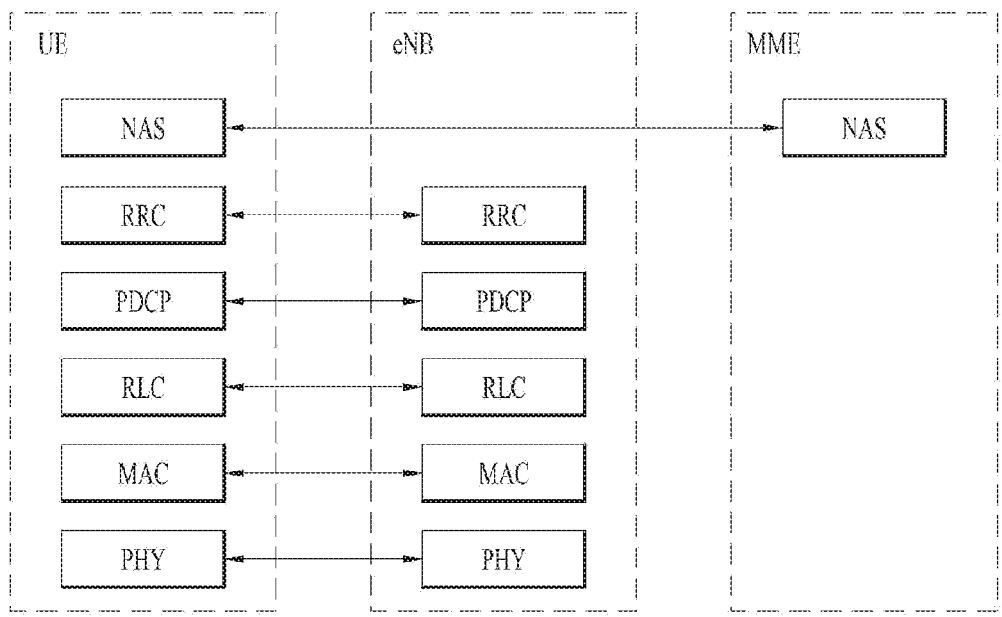
(a) Control-Plane Protocol Stack
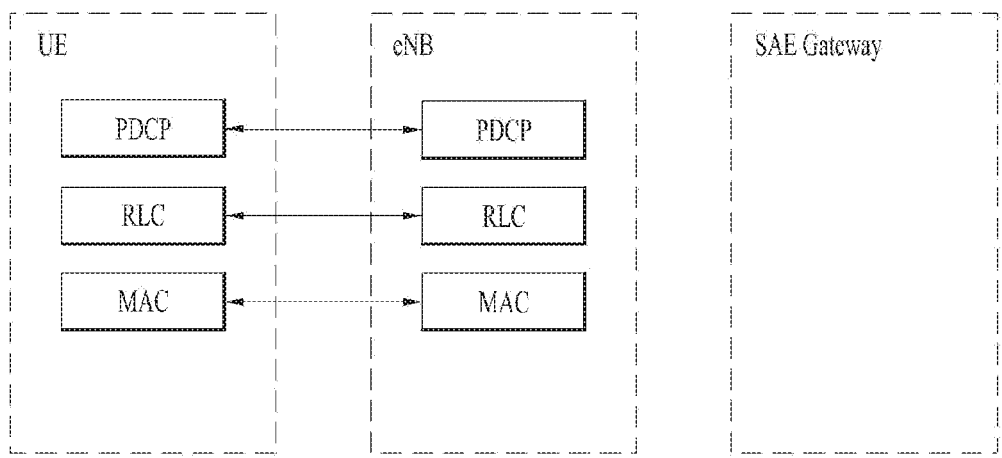
(b) User-Plane Protocol Stack FIG. 6
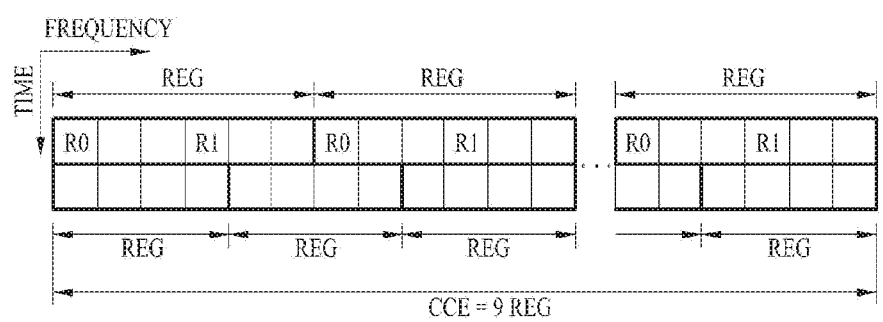
(a) 1 TX or 2 TX
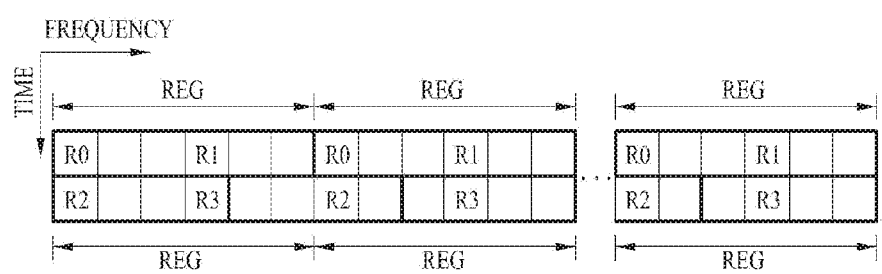
(b) 4 TX FIG. 20
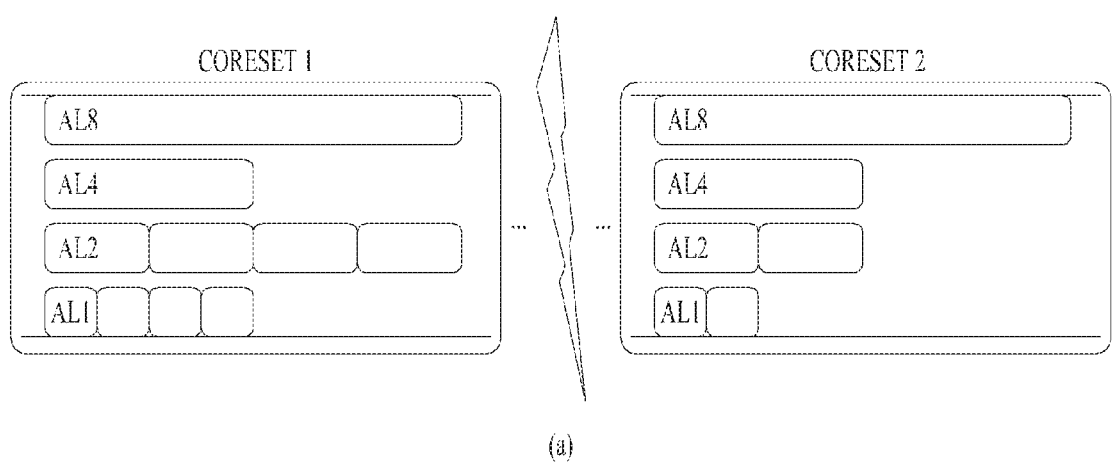
(a)
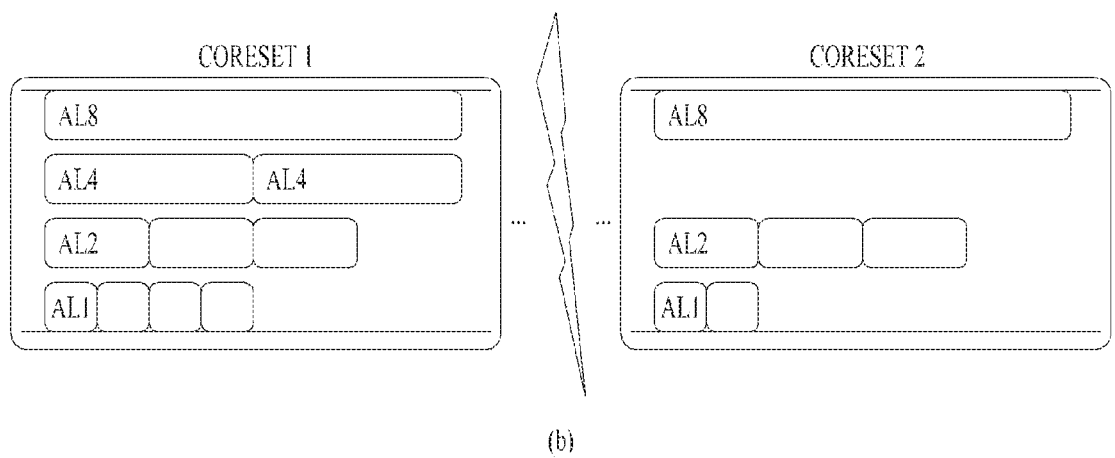
(b)

Available resources

FIG. 29
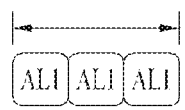
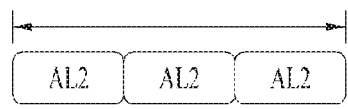
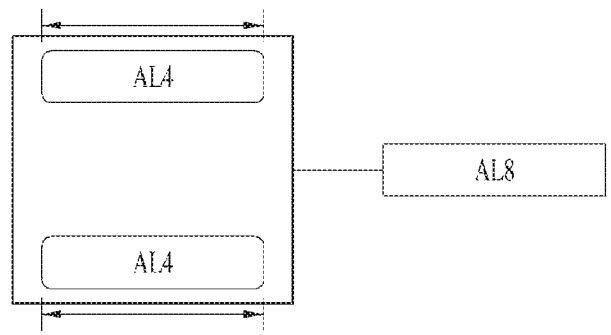
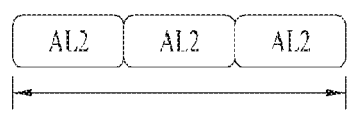

METHOD FOR RECEIVING DOWNLINK CONTROL CHANNEL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/001587, filed on Feb. 6, 2018, which claims the benefit of U.S. Provisional Application No. 62/454,953, filed on Feb. 6, 2017, 62/476,706, filed on Mar. 24, 2017, 62/507,729, filed on May 17, 2017, 62/520,445, filed on Jun. 15, 2017, 62/539,501, filed on Jul. 31, 2017, 62/557,134, filed on Sep. 11, 2017, and 62/567,185, filed on Oct. 2, 2017, the contents of which are hereby incorporated by reference herein in their entirety.

TECHNICAL FIELD

The present disclosure relates to a method and apparatus for receiving a downlink control channel, and more particularly, to a method and apparatus for performing blind decoding on a search space in a downlink control region of at least one received symbol.

BACKGROUND ART

3GPP LTE (3rd generation partnership project long term evolution hereinafter abbreviated LTE) communication system is schematically explained as an example of a wireless communication system to which the present disclosure is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An aspect of the present disclosure is to provide a method and apparatus for performing blind decoding on a search space including a plurality of physical downlink control channel (PDCCH) candidates corresponding to aggregation levels in a received downlink control region, in which channel estimation for an overlap between PDCCH candidates defined for respective aggregation levels is shared, and blocking is reduced.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving a downlink control channel at a user equipment (UE) in a wireless communication system includes receiving at least one symbol including a downlink control region, and performing blind decoding on a search space in the downlink control region. The search space includes a plurality of physical downlink control channel (PDCCH) candidates, each PDCCH candidate corresponding to an aggregation level and including a control channel element (CCE), and each of the plurality of PDCCH candidates overlaps with at least one PDCCH candidate.

According to an example of the present disclosure, the plurality of PDCCH candidates may include a first PDCCH candidate corresponding to a first aggregation level, and a second PDCCH candidate corresponding to a second aggregation level lower than the first aggregation level, and the second PDCCH candidate may be fully or partially included in the first PDCCH candidate.

According to an example of the present disclosure, the first aggregation level may be a highest of the aggregation levels corresponding to the plurality of PDCCH candidates.

According to an example of the present disclosure, the first PDCCH candidate may be a PDCCH candidate in a common search space, and the second PDCCH candidate is a PDCCH candidate in a UE-specific search space.

According to an example of the present disclosure, a second starting point being a starting point of the second PDCCH candidate may be determined randomly according to at least one of a first starting point being a starting point of the first PDCCH candidate, the first aggregation level, or the second aggregation level, and may be different from the first starting point.

According to an example of the present disclosure, a remaining PDCCH candidate except for the first PDCCH candidate and the second PDCCH candidate among the plurality of PDCCH candidates may be arranged to fully or partially overlap with the first PDCCH candidate.

According to an example of the present disclosure, each of the plurality of PDCCH candidates may fully or partially overlap with a virtual PDCCH candidate, and the virtual PDCCH candidate may be a PDCCH candidate corresponding to a virtual aggregation level, not to be monitored.

According to an example of the present disclosure, the virtual aggregation level may be higher than a highest of the aggregation levels corresponding to the plurality of PDCCH candidates.

According to an example of the present disclosure, the search space may include a first search space candidate and a second search space candidate which are separate from each other, the first search space candidate may include a first PDCCH candidate corresponding to a first aggregation level and a second PDCCH candidate arranged within the first PDCCH candidate and corresponding to a second aggregation level lower than the first aggregation level, and the second search space candidate may include a third PDCCH candidate corresponding to a third aggregation level and a fourth PDCCH candidate arranged within the third PDCCH candidate and corresponding to a fourth aggregation level lower than the third aggregation level.

According to an example of the present disclosure, the first aggregation level may be a highest of aggregation levels corresponding to PDCCH candidates included in the first search space candidate, and the second aggregation level is a highest of aggregation levels corresponding to PDCCH candidates included in the second search space candidate.

According to an example of the present disclosure, the downlink control region may include a first control resource set (CORESET) and a second CORESET, including resources in which the search space is arranged. The first search space may be arranged in the first CORESET, and the second search space may be arranged in the second CORESET.

According to an example of the present disclosure, the number of PDCCH candidates included in each of the first search space candidate and the second search space candidate may be determined based on the number of symbols and available resources in each of the first CORESET and the second CORESET.

According to an example of the present disclosure, the method may further include detecting downlink control information (DCI) based on a control channel element (CCE) detected by the blind decoding.

Advantageous Effects

According to the present disclosure, blind decoding is performed on a search space including a plurality of physical downlink control channel (PDCCH) candidates corresponding to aggregation levels in a received downlink control region. Herein, channel estimation for an overlap between PDCCH candidates defined for respective aggregation levels may be shared, and blocking may be reduced.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 2 is a diagram illustrating structures of a control plane and a user plane of a radio interface protocol between a UE and an evolved UMTS terrestrial radio access network (E-UTRAN) based on the $3^{rd}$ generation partnership project (3GPP) radio access network standard;

FIG. 6 is a diagram illustrating resource units used to configure a DL control channel in the LTE system;

FIGS. 9 to 30 are diagrams illustrating methods of configuring a search space in a DL subframe according to an embodiment of the present disclosure.

BEST MODE FOR CARRYING OUT THE INVENTION

Figure 1:
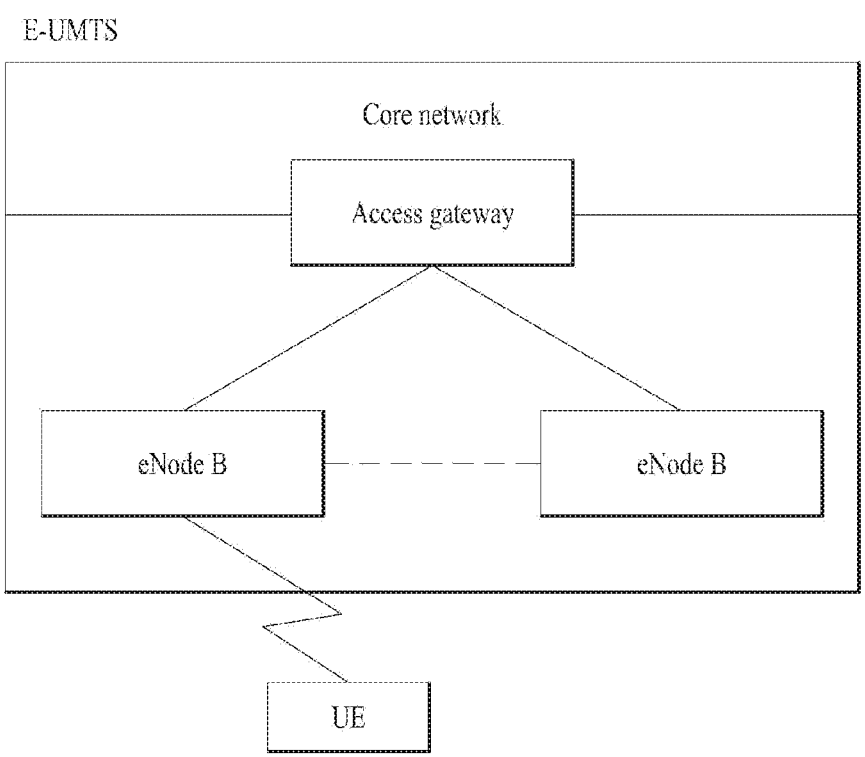
FIG. 1 is a diagram schematically illustrating a network structure of an evolved universal mobile telecommunications system (E-UMTS) as an exemplary radio communication system.

The configuration, operation and other features of the present disclosure will be understood by the embodiments of the present disclosure described with reference to the accompanying drawings. The following embodiments are examples of applying the technical features of the present disclosure to a 3rd Generation Partnership Project (3GPP) system.

Although the embodiments of the present disclosure will be described based on an LTE system and an LTE-advanced (LTE-A) system, the LTE system and the LTE-A system are purely exemplary and the embodiments of the present disclosure can be applied to any communication system corresponding to the aforementioned definition. Moreover, although the present specification describes an embodiment of the present disclosure with reference to FDD system, this is just exemplary. And, the embodiments of the present disclosure can be applied to H-FDD or TDD system by being easily modified.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
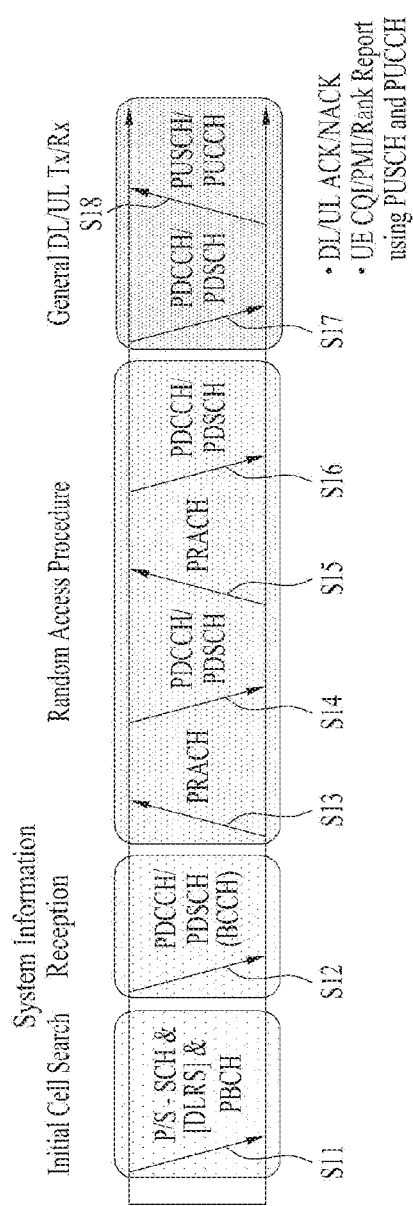
FIG. 3 is a diagram illustrating physical channels used in a 3GPP system and a general signal transmission method using the physical channels.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
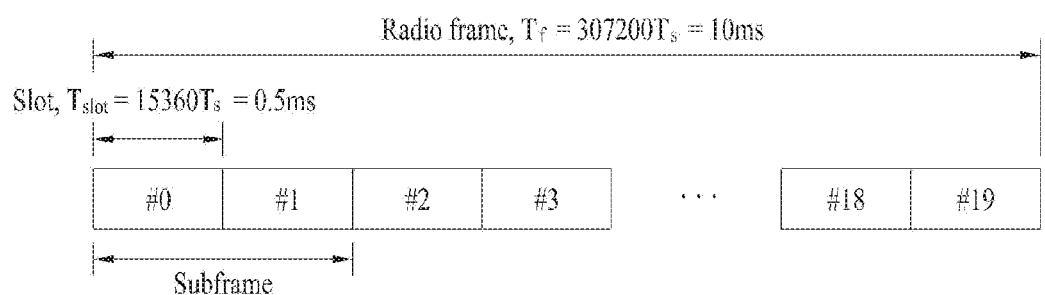
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz×2048) =3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
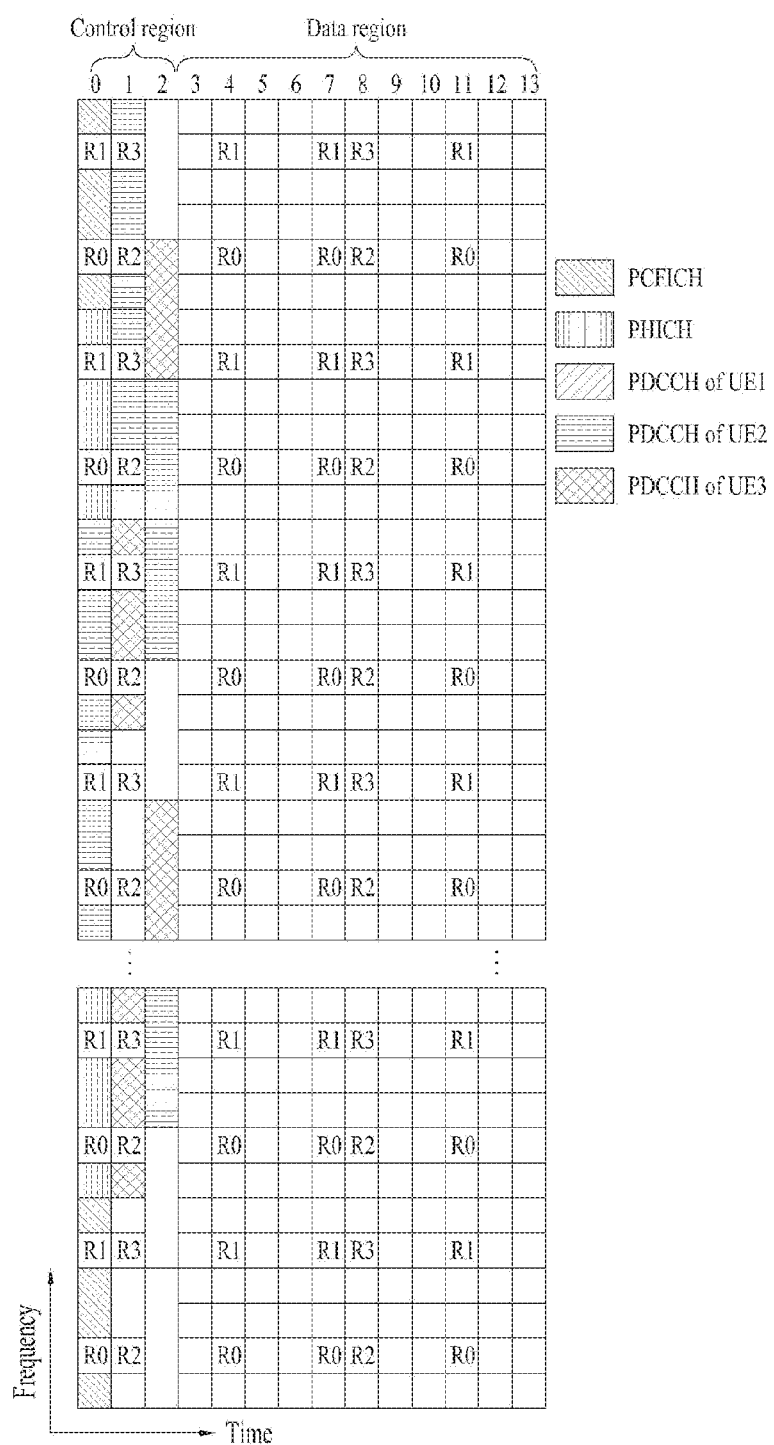
FIG. 5 is a diagram illustrating the structure of a downlink (DL) radio frame used in the LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

FIG. 6 is a diagram illustrating resource units used to configure a DL control channel in the LTE system. Particularly, FIG. 6(a) illustrates a case in which an eNB has one or two transmission (Tx) antennas, and FIG. 6(b) illustrates a case in which an eNB has four Tx antennas. For different numbers of Tx antennas, although different reference signal (RS) patterns are used, resource units related to a control channel are configured in the same manner.

Referring to FIG. 6, a basic resource unit for a DL control channel is a resource element group (REG). One REG includes four consecutive resource elements (REs) except for an RS. REGs are outlined in bold in FIG. 6. The PCFICH and the PHICH include 4 REGs and 3 REGs, respectively. The PDCCH is configured in CCEs, each CCE including 9 REGs.

A UE is configured to monitor $M^{(L)}(\geq L)$ (CCEs which are contiguous or arranged according to a predetermined rule in order to determine whether a PDCCH including L CCEs is directed to the UE. The UE may have to consider a plurality of L values to receive the PDCCH. CCE sets that the UE is to monitor for PDCCH reception are referred to as a search space. For example, search spaces are defined as listed in Table 1 in the LTE system.

TABLE 1

| Type | Search Space $S_k^{(L)}$ | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The CCE aggregation level L represents the number of CCEs in a PDCCH, $s_k^{(L)}$ represents a search space for the CCE aggregation level L, and $M^{(L)}$ represents the number of PDCCH candidates to be monitored in the search space for the CCE aggregation level L.

Search spaces may be classified into a UE-specific search space accessible only to a predetermined UE and a common search space accessible to all UEs. The UE monitors common search spaces of aggregation levels 4 and 8, and UE-specific search spaces of aggregation levels 1, 2, 4, and 8. A common search space may overlap with a UE-specific search space.

The position of the first CCE (the CCE with the smallest index) in a PDCCH search space assigned to a UE for each CCE aggregation level changes in each subframe according to the UE. This is called PDCCH search space hashing.

A CCE may be distributed across a system band. More specifically, an interleaver may receive a plurality of logically contiguous CCEs and interleave the CCEs at an REG level. Accordingly, the frequency/time resources of one CCE are physically distributed across a total frequency/time area in a control region of a subframe. Because a control channel is configured in CCEs and interleaved at the REG level, the frequency diversity and interference randomization gain of the control channel may be maximized.

Figure 7:
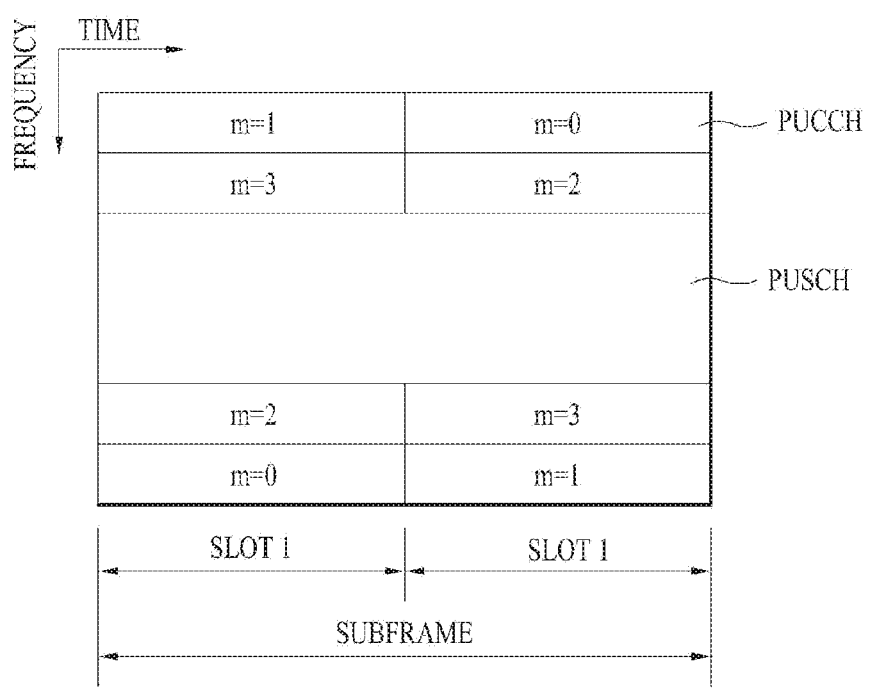
FIG. 7 is a diagram illustrating the structure of an uplink (UL) subframe in the LTE system.

FIG. 7 is a diagram illustrating the structure of a UL subframe in an LTE system.

Referring to FIG. 7, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 7.

Figure 8:
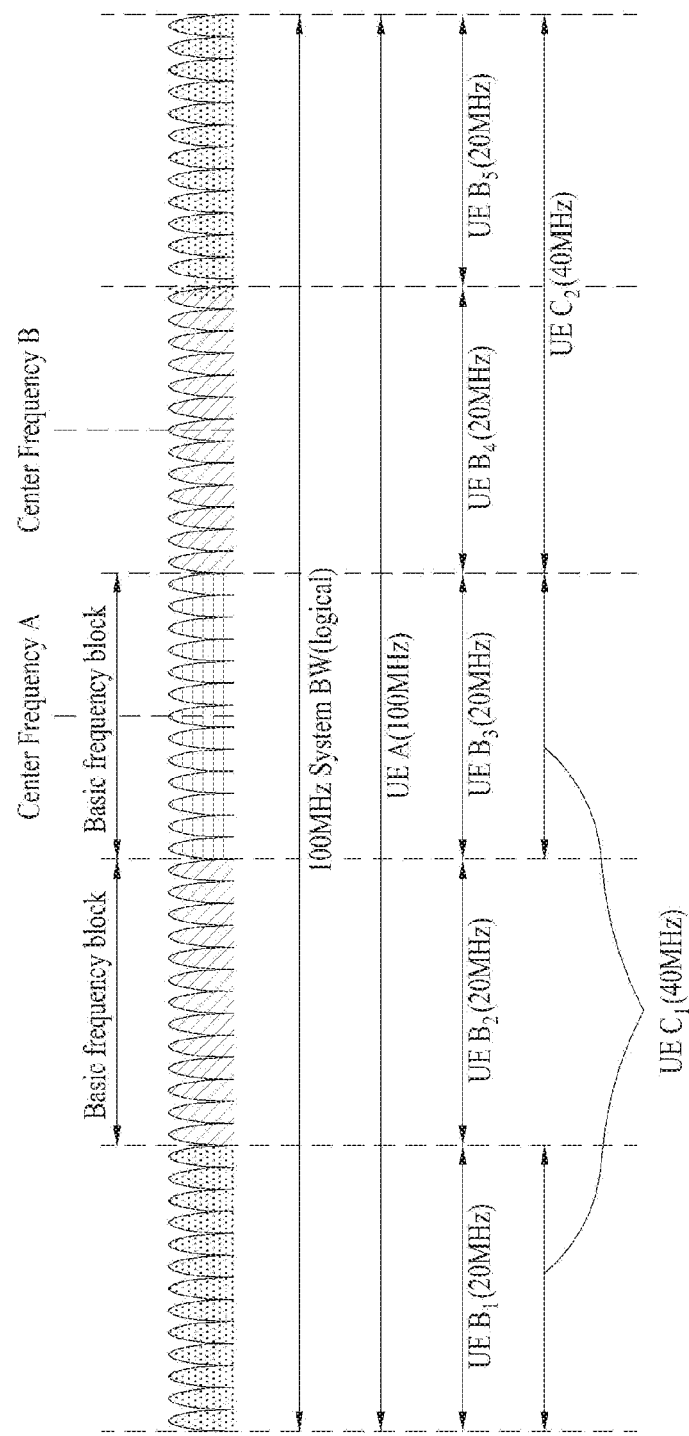
FIG. 8 is a conceptual view illustrating carrier aggregation (CA)

FIG. 8 is a conceptual view illustrating carrier aggregation (CA).

CA is a technique of aggregating a plurality of frequency blocks or (logical) cells including UL resources (or component carriers (CCs)) and/or DL resources (or CCs) into one wide logical frequency band at a UE, so that a wireless communication system may use a wider frequency band. For the convenience of description, the term CC is uniformly used.

Referring to FIG. 8, a total system band is a logical band having a bandwidth (BW) of up to 100 MHz. The total system band includes 5 CCs each having a BW of up to 20 MHz. A CC includes one or more physically contiguous subcarriers. While CCs are shown as having an equal BW in FIG. 8, this is merely an example, and the CCs may have different BWs. Further, while the CCs are shown in FIG. 8 as contiguous to each other in the frequency domain, FIG. 8 illustrates the CCs from a logical perspective. Thus, the CCs may be physically contiguous or non-contiguous.

A different center frequency may be used for each CC, or one common center frequency may be used for physically contiguous CCs. For example, if all CCs are contiguous in FIG. 9, center frequency A may be used. Further, if all CCs are not physically contiguous, center frequency A and center frequency B may be separately used for the CCs.

In the present disclosure, a CC may correspond to the system band of a legacy system. Because a CC is defined based on the legacy system, backward compatibility may be provided and system design may be facilitated in a wireless communication environment in which advanced UEs and legacy UEs co-exist.

If a total system band is extended by CA, a frequency band used in communication with each UE is defined in CCs. UE A may use the total system BW, 100 MHz and communicate using all of 5 CCs. Each of UE $B_1$ to UE $B_5$ is allowed to use only 20 MHz and communicate in one CC. Each of UE $C_1$ and UE $C_2$ may use a BW of 40 MHz and communicate in two CCs. The two CCs may be contiguous or non-contiguous logically/physically. UE $C_1$ uses two non-contiguous CCs, and UE $C_2$ uses two contiguous CCs.

While the LTE system uses one DL CC and one UL CC, the LTE-A system may use multiple CCs as illustrated in FIG. 6. A control channel may schedule a data channel in two methods: legacy linked carrier scheduling and cross carrier scheduling.

More specifically, in linked carrier scheduling, a control channel transmitted in a specific CC schedules only a data channel in the specific CC as in the legacy LTE system using a single CC.

In cross carrier scheduling, a control channel transmitted in a primary CC schedules a data channel transmitted in the primary CC or another CC by means of a carrier indicator field (CIF).

Now, a description will be given of a method of indicating the position of a PDCCH candidate in a search space based on the foregoing description.

First, let the number of CCEs configured in subframe k be denoted by $N_{CCE,k}$ and let the CCEs be indexed as 0 to $N_{CCE,k}-1$. Then, a 3GPP technical specification defines the positions of PDCCH candidates m (m=0, ..., $M^{(L)}-1$) with aggregation level L in a search space $s_k^{(L)}$ (L∈{1, 2, 4, 8}) by Equation 1.

$$L\{(Y_k+m') \bmod \lfloor N_{CCE,k}/L \rfloor\}+i \quad \text{[Equation 1]}$$

In Equation 1, m'=m for a common search space (CSS). If the CIF is not defined, that is, cross carrier scheduling is not applied, m'=m even for a UE-specific search space (USS). On the other hand, if the CIF is defined, that is, cross carrier scheduling is applied, m' is defined by m'=m+$M^{(L)} \cdot n_{Ci}$ where $n_{Ci}$ represents a CIF value.

Further, $Y_k$ is set to 0 for the CSS. On the other hand, for the USS, $Y_k$ may be defined by a hashing function according to Equation 2.

$$Y_k=(A \cdot Y_{k-1}) \bmod D \quad \text{[Equation 2]}$$

In Equation 2. A=39827 and D=65537. Further k=$\lfloor n_s/2 \rfloor$ where $n_s$ represents the index of a slot in one radio frame. Further, $Y_{-1}$ may be set to an initial value, that is, $Y_{-1}=n_{RNTI} \neq 0$ where $n_{RNTI}$ represents a UE ID.

The emergence and proliferation of machine-to-machine (M2M) communication and various devices requiring high data rates are driving force behind a rapid increase in required data for a cellular network in the current wireless communication environment. To satisfy high data rates, communication technology has been developed toward CA for efficient use of more frequency bands, multiple antennas for increasing a data capacity within a limited frequency, and coordinated multi-point (CoMP), and so on, and the communication environment has been evolving toward increasing the density of nodes accessible to users. Such a system with densely populated nodes may have higher system performance through cooperation between nodes. The cooperative operation leads to much better performance than without cooperation between nodes which operate as independent base stations (BSs), advanced BSs (ABSs), Node Bs (NBs), evolved Node Bs (eNBs or eNode Bs), access points (APs), or the like.

Before describing embodiments of the present disclosure, DL control information for 1-ms TTI-based operations including a PDSCH/PUSCH is referred to as DCI, and DL control information related to a shorter TTI than a 1-ms TTI is referred to as sDCI.

The Candidate Space Allocation with the Higher AL Candidate Space

In the current LTE-A, an aggregation level (AL) is defined as the number of contiguous CCEs grouped into one group, each CCE being a resource unit for PDCCH transmission. Four ALs are defined and use 1, 2, 4, and 8 CCEs, respectively in the LTE-A system. A search space is defined as an area in which CCEs configured for each AL may be included, and has a fixed size. Because the length of CCEs carrying one PDCCH is different for different ALs, the number of PDCCH candidates available in the search space may be different according to the ALs. A PDCCH candidate is a possible space including actual CCEs, and a set of PDCCH candidates form the search space.

Although a UE may acquire DCI by receiving a PDCCH directed to the UE from an eNB, the UE does not have accurate knowledge of a PDCCH candidate including the PDCCH. However, the UE may determine the position of a search space in which the PDCCH may be transmitted, and acquire the PDCCH by blind-decoding of the search space. A plurality of UEs may have their respective search spaces, and the search spaces may overlap with each other.

When performing blind decoding on each PDCCH candidate, the UE individually performs channel estimation on the PDCCH candidate. That is, as the number of PDCCH candidates increases, the UE should perform channel estimation on a range corresponding to the number of PDCCH candidates. The channel estimation is correlated to the processing load of the UE.

Figure 9:
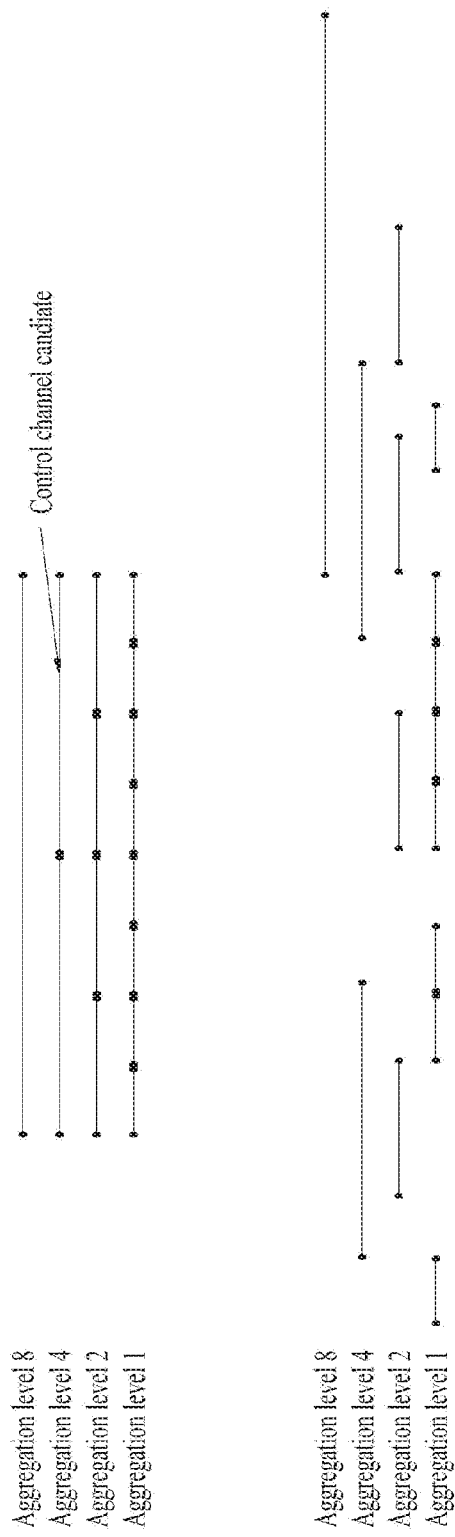

For blind decoding to detect the PDCCH directed to the UE, the UE should first perform a channel estimation process. As an approach to reduction of the computation volume of the channel estimation, a hierarchical structure may be considered. Referring to FIG. 9, in the hierarchical structure, the hashing points of PDCCH candidates with respective ALs are all the same, and channel estimation information about CCEs with the respective ALs may be shared. In this case, the UE may search for its PDCCH by blind decoding, with a reduced computation volume of channel estimation. That is, because PDCCH candidates for the respective ALs have the same hashing point, there may be a set of PDCCH candidates corresponding to one hashing point.

Despite the above-described advantage, the hierarchical structure may cause blocking. A plurality of UEs may determine the hashing points of PDCCH candidates to be blind-decoded by a hashing function. The plurality of UEs may coincide in the hashing points of the PDCCH candidates. The plurality of UEs may perform blind decoding on a set of PDCCH candidates in a certain hierarchical structure. In this case, if one PDCCH candidate in the PDCCH candidate set is allocated to a specific UE, none of the PDCCH candidates of the PDCCH candidate set are allocated to the other UEs that blind decode the PDCCH candidate set. This is called blocking.

When the UE detects its PDCCH in the search space, the UE may acquire (or detect) DCI based on the CCEs of the PDCCH.

A method of minimizing the above-described blocking, while maximizing reuse of channel estimation according to the present disclosure will be described below.

The hashing point of a PDCCH candidate with a higher AL may be predefined. The length $L_1$ of a PDCCH candidate with a lower AL is smaller than the length $L_h$ of the PDCCH candidate with the higher AL. PDCCH candidates with lower ALs may be arranged randomly within the PDCCH candidate with the higher AL. For this purpose, the PDCCH candidates with the lower ALs may have hashing points $HP_1$ according to Equation 3 below. The PDCCH candidates with the lower ALs, which have the hashing points $HP_1$ may be arranged within the PDCCH candidate with the higher AL. In this structure, the result of channel estimation performed earlier for each AL may be reused.

$$HP_1 = HP_h + \alpha \quad \text{[Equation 3]}$$

$L_h$ represents the length of the PDCCH candidate with the higher AL, $HP_h$ represents the hashing point of the PDCCH candidate with the higher AL, and a first parameter $\alpha$ is a point parameter added to randomly arrange the PDCCH candidates with the lower ALs, as defined by Equation 4.

$$0 \leq \alpha \leq \Delta L, (\Delta L = L_h - L_1) \quad \text{[Equation 4]}$$

Because the eNB has knowledge of $HP_h$, $L_1$, and L, the eNB may define the first parameter $\alpha$. The UE may define the first parameter $\alpha$, using specific information such as an identity number or identity index which is predetermined in the relationship between the UE and the eNB.

An environment using search spaces and PDCCH formats defined in the current LTE-A, as listed in Table 2 below is assumed. The length of a PDCCH candidate with the highest AL is 8 CCEs, and the hashing point $HP_{hst}$ of the PDCCH candidate may be defined by the afore-described Equation 1.

In this case, PDCCH candidates with lower ALs may have hashing points determined by Equation 3, and may be arranged randomly within the 8 CCEs of the PDCCH candidate with the highest AL. Specifically, the first parameter $\alpha$ for each AL may be defined by $0 \leq \alpha \leq 4$ for AL=4, $0 \leq \alpha \leq 6$ for AL=2, and $0 \leq \alpha \leq 7$ for AL=1.

Figure 10:
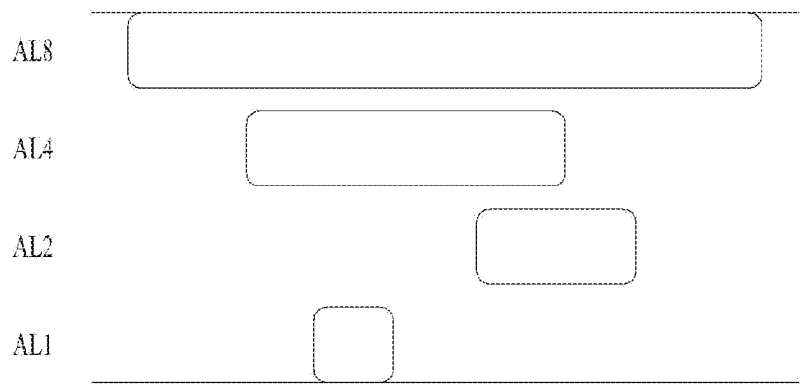

Referring to FIG. 10, PDCCH candidates with all ALs may be arranged within a PDCCH candidate with a highest AL according to the first parameter $\alpha$, and have different hashing points from the hashing point $HP_{hst}$ of the PDCCH candidate with the highest AL. The highest AL may be AL4 or AL2, not limited to AL8.

TABLE 2

| PDCCH format | Number of CCEs (Aggregation level) (n) | Space size in terms of CCE Common | Space size in terms of CCE UE-specific | Number of candidates In common search space | Number of candidates In UE-specific search space |
|---|---|---|---|---|---|
| 0 | 1 | — | 6 | — | 6/1 = 6 |
| 1 | 2 | — | 12 | — | 12/2 = 6 |
| 2 | 4 | 16 | 8 | 16/4 = 4 | 8/4 = 2 |
| 3 | 8 | 16 | 16 | 16/2 = 2 | 16/8 = 2 |

Figure 11:
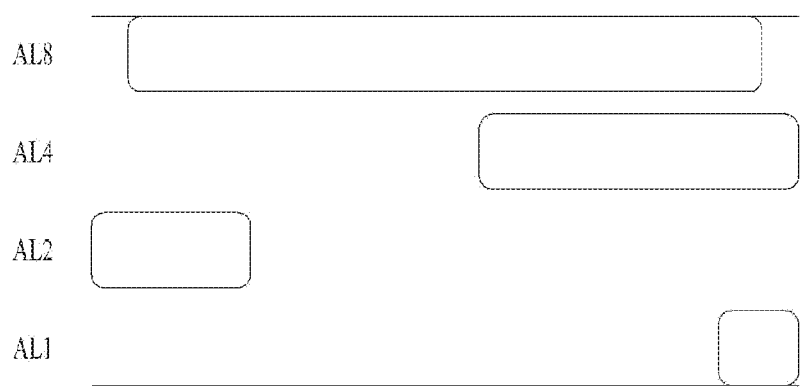

Referring to FIG. 11, PDCCH candidates with lower ALs may be arranged randomly to partially overlap with a PDCCH candidate with a higher AL. In this case, the UE may reuse part of the result of channel estimation performed for each AL, and perform additional channel estimation only on the non-overlapped part.

In this case, the hashing points $HP_1$ of the PDCCH candidates with the lower ALs may be defined by Equation 5.

$$HP_1 = Hp_h + \beta \quad \text{[Equation 5]}$$

A second parameter $\beta$ is a point parameter added to randomly arrange the PDCCH candidates with the lower ALs within the PDCCH candidate with the higher AL, with partial overlap. The second parameter $\beta$ may be defined by Equation 6.

$$-L_1 < \beta \leq 0 \text{ and } \Delta L \leq \beta < L_h, (\Delta L = L_h - L_1) \quad \text{[Equation 6]}$$

Because the eNB has knowledge of $HP_h$, $L_1$, and L, the eNB may define the second parameter $\beta$. The UE may define the first parameter $\beta$, using specific information such as the identity number or identity index which is predetermined in the relationship between the UE and the eNB.

An environment using search spaces and PDCCH formats defined in the current LTE-A, as listed in Table 4 below is assumed. The length of a PDCCH candidate with the highest AL is 8 CCEs, and the hashing point $HP_{hst}$ of the PDCCH candidate may be defined by the afore-described Equation 1.

In this case, PDCCH candidates with lower ALs may have hashing point determined by Equation 5, and may be arranged randomly within the 8 CCEs of the PDCCH candidate with the highest AL. Specifically, the second parameter β for each AL may be defined by −4<β≤0 or 4≤β<8 for AL=4, −2<β≤0 or 6≤β<8 for AL=2, and −1<β≤0 or 7≤β<8 for AL=1.

Referring to FIG. 11, PDCCH candidates with all ALs may have different hashing points from the hashing point $HP_{hst}$ of the PDCCH candidate with the highest AL, while partially overlapping with the PDCCH candidate with the highest AL (or while spanning part of the PDCCH candidate with the highest AL) according to the second parameter β. The highest AL may be AL 4 or AL 2, not limited to AL 8.

Figure 12:
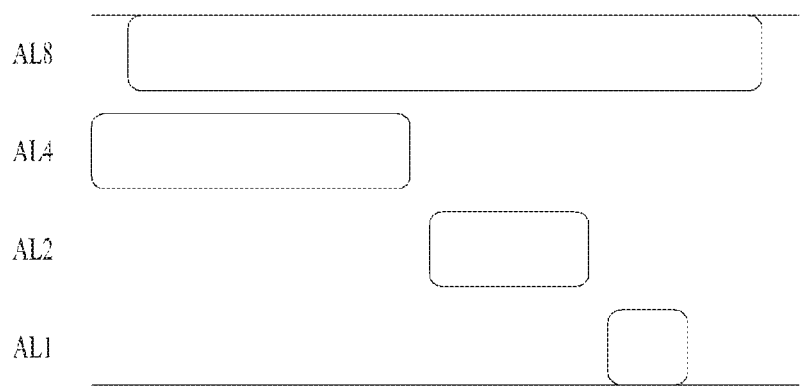

Alternatively, as illustrated in FIG. 12, PDCCH candidates with lower ALs may be randomly arranged inside or near to a PDCCH candidate with a higher AL. The PDCCH candidates with the lower ALs may be arranged freely as far as the PDCCH candidates are not completely outside the PDCCH candidate with the higher AL. If the PDCCH candidates with the lower ALs are inside the PDCCH candidate with the higher AL, the UE may still apply channel estimation performed on the PDCCH candidate with the high AL. If the PDCCH candidates with the lower ALs partially overlap with the PDCCH candidate with the higher AL, the UE may reuse the result of channel estimation performed for each AL for an overlapped part, and perform additional channel estimation for a non-overlapped part.

In this case, the PDCCH candidates with the lower ALs have hashing points $HP_1$ by Equation 7.

$$HP_1 = HP_h + \gamma +\qquad\text{[Equation 7]}$$

A third parameter γ is a point parameter added to randomly arrange the PDCCH candidates with the lower ALs inside or near to the PDCCH candidate with the higher AL. The third parameter γ may be defined by Equation 8.

$$-L_1 < \gamma < L_h, (\Delta L = L_h - L_1)\qquad\text{[Equation 8]}$$

Because the eNB has knowledge of $HP_h$, $L_1$, and L, the eNB may define the third parameter γ. The UE may define the third parameter γ, using specific information such as the identity number or identity index which is predetermined in the relationship between the UE and the eNB.

An environment using search spaces and PDCCH formats defined in the current LTE-A, as listed in Table 4 described before is assumed. The length of a PDCCH candidate with the highest AL is 8 CCEs, and the hashing point $HP_{hst}$ of the PDCCH candidate may be defined by the afore-described Equation 1.

In this case, the PDCCH candidates with the lower ALs may have hashing points determined by Equation 7 and may be arranged randomly within the 8 CCEs of the PDCCH candidate with the highest AL. Specifically, the third parameter γ for each AL may be defined by −4<γ<8 for AL=4, 2<γ<8 for AL=2, and −1<γ<8 for AL=1.

Referring to FIG. 12, PDCCH candidates with all ALs may have different hashing points from the hashing point $HP_{hst}$ of a PDCCH candidate with a highest AL, while overlapping fully or partially with the PDCCH candidate with the highest AL (or being located near to the PDCCH candidate with the highest AL) according to the third parameter γ. The highest AL may be AL 4 or AL 2, not limited to AL 8.

In other words, the UE may receive at least one symbol including a DL control region from the eNB and perform blind decoding on a search space in the received control region. The search space includes a plurality of PDCCH candidates each corresponding to an AL and including a CCE. The UE performs blind decoding on each of the plurality of PDCCH candidates in the search space and detect a PDCCH directed to the UE from among the plurality of PDCCH candidates. The plurality of PDCCH candidates are arranged overlapped with a certain PDCCH candidate. The certain PDCCH candidate may be a PDCCH candidate with a highest AL among the plurality of PDCCH candidates.

For example, the plurality of PDCCH candidates may include a first PDCCH candidate corresponding to a first AL and a second PDCCH candidate corresponding to a second AL. The second PDCCH candidate is arranged overlapped with the first PDCCH candidate. In this case, the PDCCH candidates may be configured in a hierarchical structure in the search space. The first AL is higher than the second AL, and may be the highest of the ALs of the plurality of PDCCH candidates. For example, the first AL may be the highest AL, AL 8 in the LTE system.

The starting point (or hashing point) of the first PDCCH candidate may first be defined. Once a first starting point being the starting point of the first PDCCH candidate is defined, a second starting point being the starting point of the second PDCCH candidate may be determined randomly with dependency on the first starting point of the first PDCCH candidate by at least one of Equation 3 to Equation 8, so that the second PDCCH candidate may overlap with the first PDCCH candidate That is, the starting points of the plurality of PDCCH candidates except for the first PDCCH candidate may be determined based on the first starting point, ALs corresponding to the plurality of PDCCH candidates, and the AL of the first PDCCH candidate by Equation 3 to Equation 8.

In this case, the second PDCCH candidate may fully or partially overlap with the first PDCCH candidate. If the search space is configured in this manner, once the PDCCH candidate with the highest AL is blind-decoded, the UE may reuse channel estimation information acquired for the PDCCH candidate with the highest AL for blind decoding of the other PDCCH candidates. In this case, the starting points of the PDCCH candidates may be set to be different, thereby minimizing the risk of blocking.

The Semi-Hierarchical Structure Grouping

PDCCH candidates may be grouped across ALs based on a hierarchical structure, wherein a plurality of semi-hierarchical structures may be constructed by grouping PDCCH candidates across a part of ALs, instead of grouping PDCCH candidates across all of the ALs. The number of semi-hierarchical structures may vary according to an AL configuration method.

PDCCH candidates with respective ALs in each semi-hierarchical structure have the same hashing point by the same hashing function. In semi-hierarchical structures form a semi-hierarchical structure set, and the hashing points of AL PDCCH candidates in each semi-hierarchical structure may be denoted by $HP_{sh-1}, \ldots, HP_{sh-n}$.

The same parameter that changes a hashing point according to an AL may be used in a hashing function for an AL group forming a semi-hierarchical structure.

An environment using the search spaces and PDCCH formats defined in the current LTE-A is assumed. The length of a PDCCH candidate with the highest AL is 8 CCEs, and the other ALs are 4, 2 and 1. Thus, a total of 4 ALs are defined. According to an embodiment of the present disclosure, a method of configuring a semi-hierarchical structure with AL 1 and AL 4 and a semi-hierarchical structure with AL 2 and AL 8, or a semi-hierarchical structure with AL 1 and AL 2 and a semi-hierarchical structure with AL 4 and AL 8 may be considered.

As described before, the hashing point of a PDCCH candidate with an AL is given in LTE as follows.

$$L\left\{(Y_k+m)\mod\left\lfloor\frac{N_{CCE,k}}{L}\right\rfloor\right\}+i\ldots Y_{-1}=n_{RNTI} \quad \text{[Equation 9]}$$

(need at Subframe 0)

Figure 13:
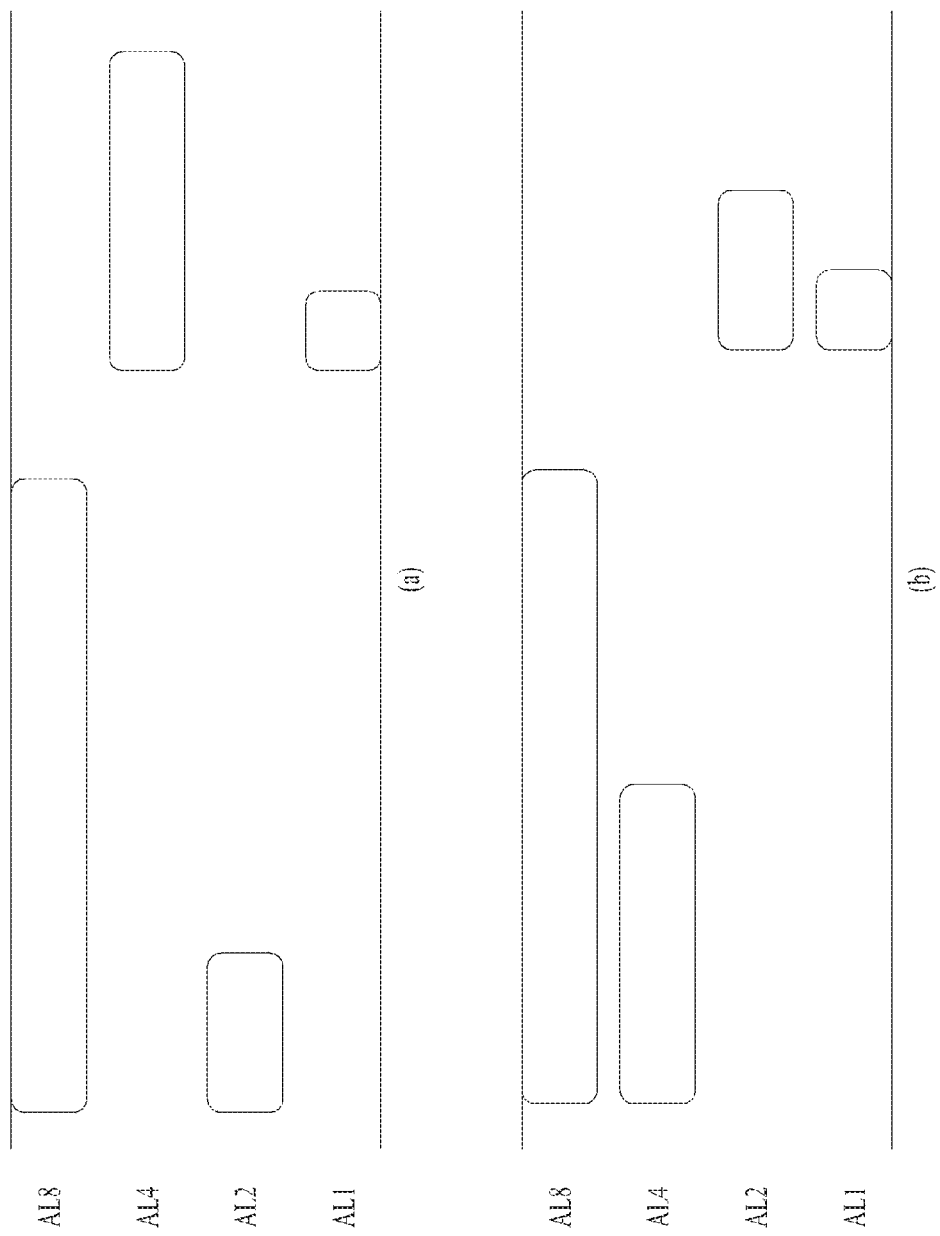

In the above equation, a parameter that inserts information about an AL is L. Conventionally, L is individually defined for each AL so that each AL PDCCH candidate has a hashing point. In contrast, as illustrated in FIG. 13, each AL group (or set) forming a semi-hierarchical structure has the same L value, and thus the PDCCH candidates of each AL group may be arranged at the same hashing point, in the present disclosure.

Figure 14:
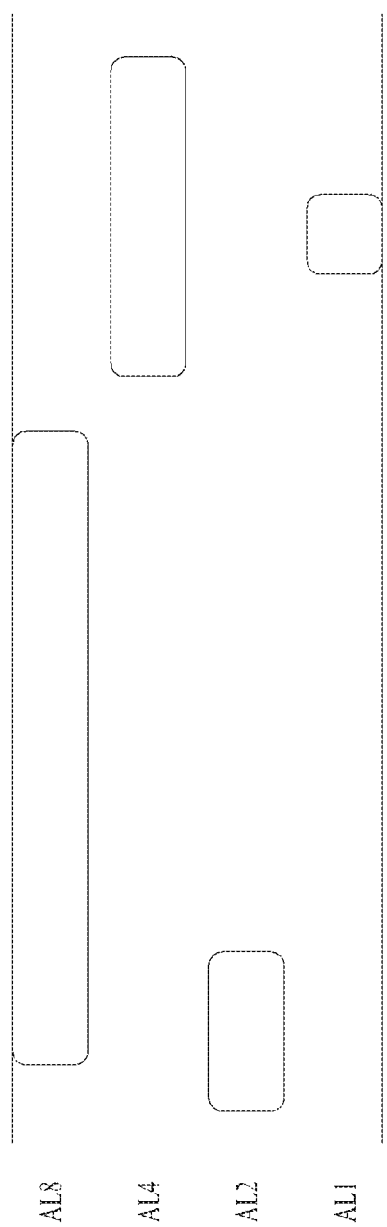

Alternatively, when a PDCCH candidate with a lower AL is arranged in a semi-hierarchical structure, the PDCCH candidate with the lower AL may be disposed near to or inside a PDCCH candidate with a higher AL (increased randomization), as illustrated in FIG. 14. In this case, the PDCCH candidate with the lower AL does not have the same hashing point as that of the PDCCH candidate with the higher AL. Rather, the PDCCH candidate with the lower AL may be disposed at any position inside the higher-AL PDCCH candidate or partially overlapping with the higher-AL PDCCH candidate. In this case, a parameter for an additional hashing point for the lower-AL PDCCH candidate is required.

A PDCCH candidate with a highest AL in a semi-hierarchical structure has a hashing point $HP_{sh-n}$ according to a basic hashing function, that is, Equation 9, and a PDCCH candidate with a lower AL has a hashing point $HP_{sh-n}^{lower}$ according to Equation 10 below.

$$HP_{sh-n}^{lower}=HP_{sh-n}+\varepsilon \quad \text{[Equation 10]}$$

A fourth parameter $\varepsilon$ is a point parameter added to randomly arrange the PDCCH candidate with the lower AL near to the PDCCH candidate with the higher AL. The fourth parameter $\varepsilon$ may be defined by Equation 11.

$$-L_1<\varepsilon<L_n. \quad \text{[Equation 11]}$$

$L_1$ represents the length of the PDCCH candidate with the lower AL, and $L_h$ represents the length of the PDCCH candidate with the higher AL. Because the eNB has knowledge of $HP_h$ (or $HP_{sh-n}$), $L_1$, and L, the eNB may define the fourth parameter $\varepsilon$. The UE may define the fourth parameter $\varepsilon$, using specific information such as the identity number or identity index which is predetermined in the relationship between the UE and the eNB.

An environment using the search spaces and PDCCH formats defined in the current LTE-A is assumed. The length of a PDCCH candidate with the highest AL is 8 CCEs, and the other ALs are 4, 2 and 1. Thus, a total of 4 ALs are defined. A first semi-hierarchical structure may be configured with AL 1 and AL 4, and a second semi-hierarchical structure may be configured with AL 2 and AL 8. In this case, hashing points $HP_{sh-1}$ and $HP_{sh-2}$ for AL 4 and AL 8 may be defined by Equation 9 which has been described before.

In this case, hashing points for the lower ALs, AL 1 and AL 2 may be calculated by the following equation.

$$HP_{sh-n}^{1}=HP_{sh-1}+\varepsilon_1$$

$$HP_{sh-n}^{2}=HP_{sh-2}+\varepsilon_2 \quad \text{[Equation 12]}$$

$\varepsilon_1$ and $\varepsilon_2$ may defined by the following equation.

$$-L_1<\varepsilon_1<L_4$$

$$-L_2<\varepsilon_2<L_8 \quad \text{[Equation 13]}$$

As illustrated in FIG. 14, each of PDCCH candidates of lower ALs may be arranged inside or partially overlapping with a PDCCH candidate with a highest AL in each semi-hierarchical structure according to fifth and sixth parameters $\varepsilon_1$ and $\varepsilon_2$ and [Equation 12].

The Hierarchical Structure that all ALs have Same Starting Point

In a search space, PDCCH candidates may be arranged in a hierarchical structure in which PDCCH candidates with all ALs have the same starting points (or hashing points). That is, the starting points of the PDCCH candidates with all ALs may be defined to be the same by a hashing function for a PDCCH candidate with a Max AL. The Max AL is the highest of used ALs, not the highest of all available ALs. For each AL, PDCCH candidates may be successively arranged, with respect to the same hashing point.

An environment using the search spaces and PDCCH formats defined in the current LTE-A is assumed. The length of a PDCCH candidate with the highest AL is 8 CCEs, and the other ALs are 4, 2 and 1. Thus, a total of 4 ALs are defined. In LTE, 2 PDCCH candidates are defined for AL 8, and 2, 6, and 6 PDCCH candidates are defined for ALs 4, 2, and 1, respectively.

Figure 15:
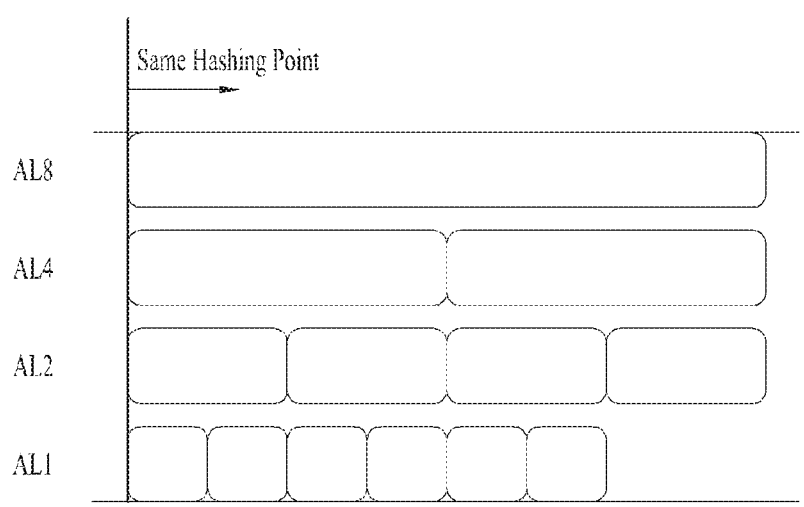

Referring to FIG. 15, PDCCH candidates with respective ALs are identical in starting points, that is, hashing points. For each AL, the remaining PDCCH candidates may be arranged successively to the corresponding PDCCH candidate. In this case, the PDCCH candidates with the ALs have the same hashing points irrespective of the ALs. Accordingly, there is no need for setting different hashing points for PDCCH candidates with different ALs. Thus, a channel estimation value for a PDCCH candidate for each AL may be shared easily.

When each of search space candidates for the ALs is configured in a hierarchical structure, two or more PDCCH candidates may exist for each AL. In this case, all PDCCH candidates may be configured separately in two hierarchical structures, not a single hierarchical structure. Because there may be at least one hashing point per hierarchical structure, a plurality of hashing functions may be required. The hierarchical structures may have the same number or different numbers of PDCCH candidates under circumstances.

Multiple hierarchical search spaces may be located in each of a plurality of control resource sets (CORESETs). That is, PDCCH candidates of a plurality of hierarchical structures (or a plurality of search space candidates) may be arranged in one CORESET. When PDCCH candidates of the hierarchical structures are arranged separately in the plurality of CORESETs, each of the hierarchical structures may have a hashing function. The hashing function refers to a hashing function for a PDCCH candidate serving as a reference in configuring a hierarchical structure. Even though multiple hierarchical structures are arranged in one CORESET, each of the hierarchical structures may have a hashing function. Even though a hashing function is shared, a hashing point of another hierarchical structure may be set by assigning an offset from a hierarchical structure used as a reference.

An environment using the search spaces and PDCCH formats defined in the current LTE-A is assumed. The length of a PDCCH candidate with the highest AL is 8 CCEs, and the other ALs are 4, 2 and 1. Thus, a total of 4 ALs are defined. In LTE, 2 PDCCH candidates are defined for AL 8, and 2, 6, and 6 PDCCH candidates are defined for ALs 4, 2, and 1, respectively.

Figure 16:
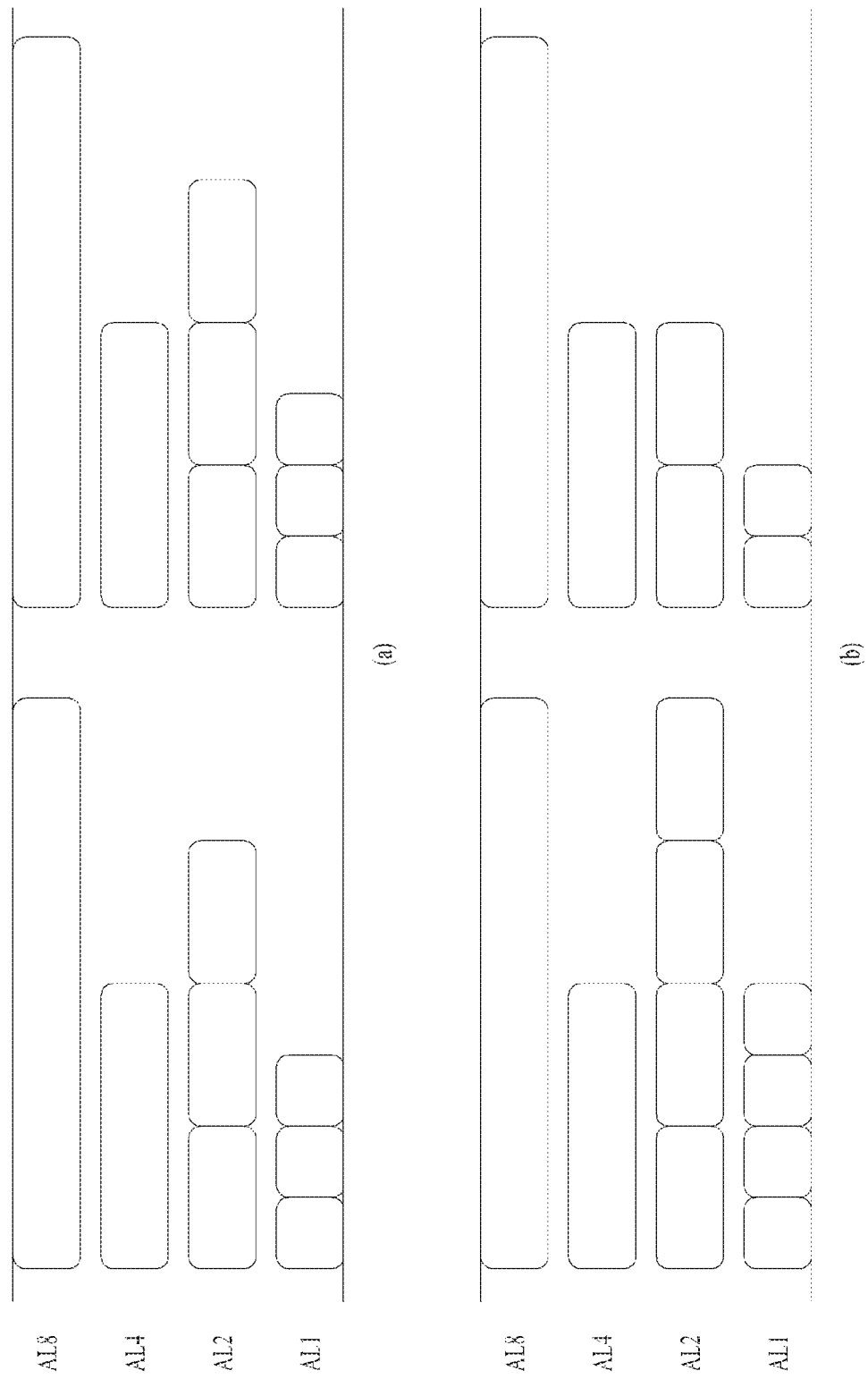

Referring to FIG. 16, a search space may include search space candidates (or hierarchical structures) each corresponding to a hierarchical structure. For example, the search space may include one hierarchical structure composed of one AL 8 PDCCH candidate, one AL 4 PDCCH candidate, three AL 2 PDCCH candidates, and three AL 1 PDCCH candidates. Alternatively, the search space may include one hierarchical structure (or hierarchical structure group 1) composed of one AL 8 PDCCH candidate, one AL 4 PDCCH candidate, four AL 2 PDCCH candidates, and four AL 1 PDCCH candidates, and one hierarchical structure (or hierarchical structure group 2) composed of one AL 8 PDCCH candidate, one AL 4 PDCCH candidate, two AL 2 PDCCH candidates, and two AL 1 PDCCH candidates.

Figure 17:
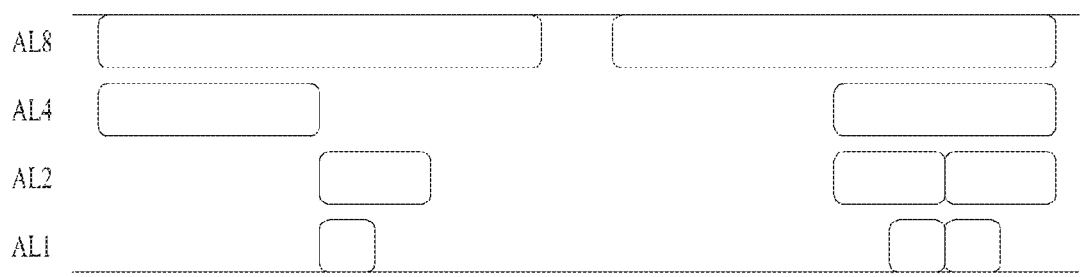

Referring to (a) and (b) in FIG. 17, a PDCCH candidate with a lower AL may first be arranged and then a PDCCH candidate with a higher AL may be arranged to necessarily include the lower-AL PDCCH candidate in a search space candidate for ALs. The PDCCH candidate with the higher AL may be stacked in various manners. If there are multiple PDCCH candidates with the lower AL, all of the PDCCH candidates with the lower AL may be arranged to be included within the PDCCH candidate with the higher AL. PDCCH candidates with ALs may be stacked in two methods: one is to always cover a PDCCH candidate with a lower AL with a PDCCH candidate with a higher AL between adjacent ALs; and the other is to overlap PDCCH candidates with all lower ALs with a PDCCH candidate with a highest AL, without overlap between PDCCH candidates of adjacent ALs.

An environment using the search spaces and PDCCH formats defined in the current LTE-A is assumed. The length of a PDCCH candidate with the highest AL is 8 CCEs, and the other ALs are 4, 2 and 1. Thus, a total of 4 ALs are defined. In LTE, 2 PDCCH candidates are defined for AL 8, and 2, 6, and 6 PDCCH candidates are defined for ALs 4, 2, and 1, respectively.

Referring to FIG. 17(b), PDCCH candidates with AL 1 are first arranged, hierarchically followed by a stack of PDCCH candidates with AL 2, a PDCCH candidate with AL 4, and then a PDCCH candidate with AL 8 in a search space candidate. Eventually, all of the PDCCH candidates with AL 1, AL2 and AL4 are included within the PDCCH candidate with AL 8. This structure is remarkably effective in that a UE may maximize reuse of a channel estimation result between PDCCH candidates with ALs.

Figure 18:
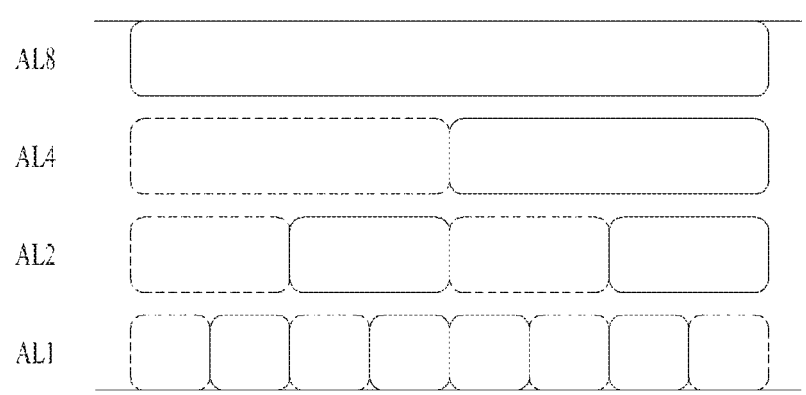

Referring to FIG. 18, when PDCCH candidates are arranged for each AL, hashing points (hereinafter, referred to as starting point candidates) available to PDCCH candidates with lower ALs, which may be arranged within a PDCCH candidate with a highest AL, may first be set and the PDCCH candidates with the lower ALs may be arranged at starting points randomly selected from the starting point candidates. That is, for each AL, PDCCH candidates may be arranged randomly, not sequentially. Herein, the starting point candidates may be determined randomly or according to the sizes of the PDCCH candidates with the lower ALs inside the PDCCH candidate with the highest AL. Alternatively, the CCEs of the highest AL may be the starting point candidates of the PDCCH candidates with the lower ALs, respectively.

In this case, because for each AL, the PDCCH candidates may be arranged individually, the PDCCH candidates with the same AL may not be arranged contiguously. The PDCCH candidates with the lower ALs may be arranged with or without overlap between them. In the former case, the starting point candidates of the PDCCH candidates with the lower ALs may be determined randomly, or may be the respective CCEs of the higher AL. Because hashing points should be determined such that the PDCCH candidates with the lower ALs are included within the PDCCH candidate with the higher AL, the PDCCH candidate with the higher AL may first be arranged.

According to an example, two hashing points may be defined for AL 4, four hashing points for AL 2, and eight hashing points for AL 1, inside one PDCCH candidate with AL 8. For each AL, PDCCH candidates may be arranged according to any hashing point randomly selected from among hashing points corresponding to the AL. Therefore, blocking between ALs may be minimized.

Alternatively, the PDCCH candidates with the ALs may be arranged in two or more hierarchical structures (e.g., a first search space candidate and a second search space candidate) The hierarchical structures may differ in the number of PDCCH candidates with a specific AL included in a search space candidate. For example, the number of PDCCH candidates with some AL may be different between the hierarchical structures. Then, for each hierarchical structure, a decision may be made as to which PDCCH candidates are to be included for the AL. For example, the PDCCH candidates with a first-level AL having a large number of PDCCH candidates may first be arranged by a certain hashing function, and PDCCH candidates with a second-level AL having a different number of PDCCH candidates from that of the PDCCH candidates with the first-level AL may be determined in consideration of a channel state or any determination method.

In other words, the search space may be configured in a plurality of hierarchical structures including the first search space candidate and the second search space candidate. Each of the first search space candidate and the second search space candidate may include a plurality of PDCCH candidates corresponding to ALs. That is, the first search space candidate may include a first PDCCH candidate corresponding to a first AL and a second PDCCH candidate corresponding to a second AL, whereas the second search space candidate may include a third PDCCH candidate corresponding to a third AL and a fourth PDCCH candidate corresponding to a fourth AL. For each AL, a plurality of PDCCH candidates may exist.

In this case, each of the first search space candidate and the second search space candidate may be configured in a hierarchical structure. Specifically, the plurality of PDCCH candidates included in the search space may be arranged to overlap with a certain single PDCCH candidate. In the first search space candidate, the second PDCCH candidate overlaps with the first PDCCH candidate, and the remaining PDCCH candidates also overlap with the first PDCCH candidate. Likewise, in the second search space candidate, the fourth PDCCH candidate overlaps with the third PDCCH candidate, and the remaining PDCCH candidates also overlap with the third PDCCH candidate.

The first AL may be the highest of ALs corresponding to the plurality of PDCCH candidates included in the first search space candidate, and the third AL may be the highest of ALs corresponding to the plurality of PDCCH candidates included in the second search space candidate. For example, if the highest of ALs corresponding to the plurality of PDCCH candidates included in the first search space candidate is AL 8, the first AL is 8, and if the highest of ALs corresponding to the plurality of PDCCH candidates included in the second search space candidate is AL 4, the third AL may be 4

Hierarchical Structure Across the CORESET

Figure 19:
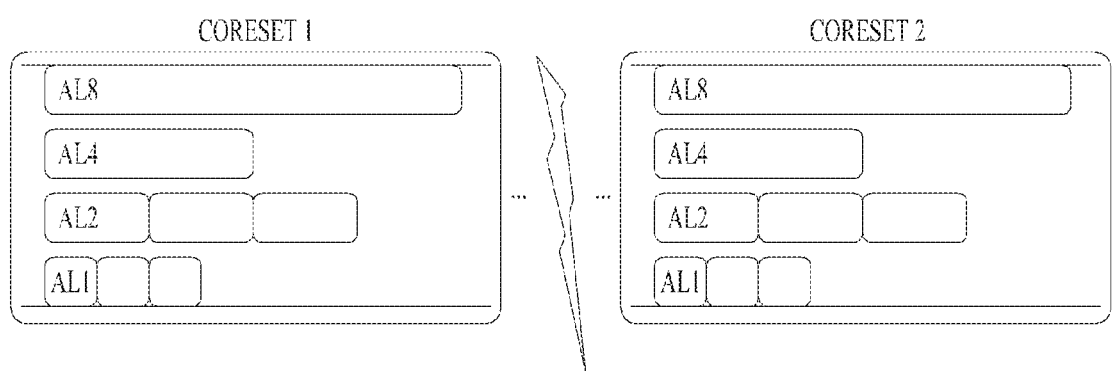

Referring to FIG. 19, a search space may be disposed using a plurality of CORESETs. The search space may be configured individually in a hierarchical structure on a CORESET basis. Each hierarchical structure (or search space candidate) may include the same number of PDCCH candidates. For this purpose, the PDCCH candidates of each AL may be divided by the number of CORESETs and arranged accordingly in the CORESETs. Then, the same number of PDCCH candidates for each AL are included in the plurality of CORESETs. In other words, a DL control region may include the plurality of CORESETs and the search space may be disposed separately across the plurality of CORESETs.

For example, when a UE is capable of acquiring DCI by performing blind decoding on two CORESETs, PDCCH candidates of a hierarchical structure may be included in each of the two CORESETs, wherein for each AL, the same number of PDCCH candidates are included in the CORESETs.

Alternatively, the search space may be configured in an independent hierarchal structure (for each search space candidate) on a CORESET basis. That is, the search space may include a search space candidate of a different hierarchical structure in each CORESET. Each search space candidate may be formed in a hierarchical structure in which at least one PDCCH candidate with a highest or higher AL is arranged in the CORESET. No PDCCH candidate or at least one PDCCH candidate may be arranged for a lower AL in each hierarchical structure (or search space candidate). The same or different number of PDCCH candidates may be included in the hierarchical structure (or search space candidate) of each CORESET.

FIG. 20 illustrates a hierarchal search space candidate configured in each CORESET. Referring to FIG. 20(a), the search space candidate disposed in each CORESET may include at least one PDCCH candidate for each AL. Referring to FIG. 20(b), the search space candidate disposed in each CORESET may include at least one PDCCH candidate for AL 8, with no PDCCH candidate or at least one PDCCH candidate for each of the remaining ALs.

Alternatively, the search space candidate arranged in each CORESET may have a different hierarchical structure, and PDCCH candidates may be arranged in the search space candidate irrespective of higher ALs or lower ALs. However, the minimum number of PDCCH candidates included in each search space candidate may be predetermined. For example, each search space candidate may be configured to include at least two PDCCH candidates. Further, adjacent ALs may not be included, when a hierarchical structure is formed for each search space candidate. Further, the same number or different numbers of PDCCH candidates may be included in the search space candidates corresponding to the CORESETs.

Figure 21:
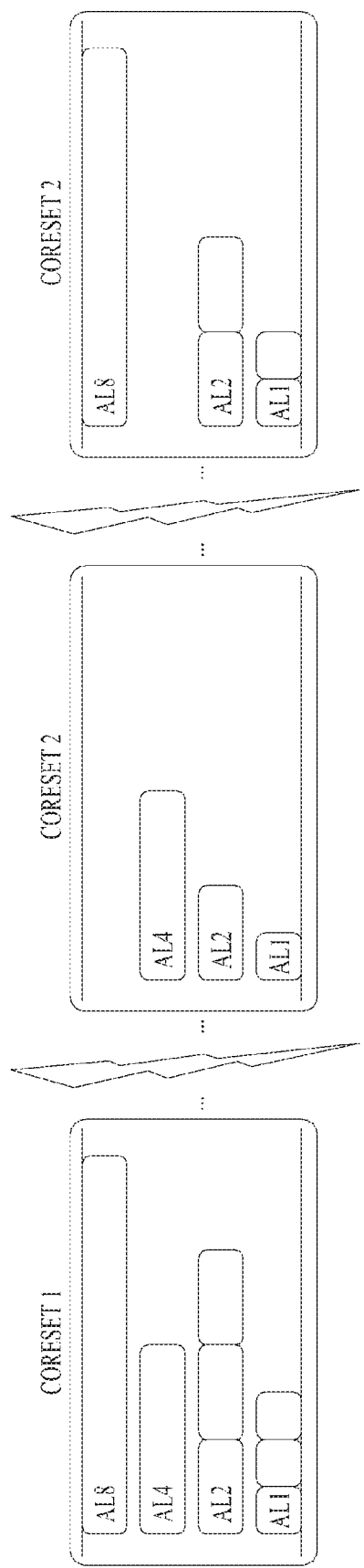

Referring to FIG. 21, a search space includes three search space candidates included respectively in three CORESETs. Although the search space candidate of each CORESET is configured in a hierarchical structure, the search space candidate does not include a PDCCH candidate for every AL.

One CORESET may include may include a plurality of search space candidates. In this case, a search space may be configured for the CORESET by applying the methods of arranging AL PDCCH candidates between search space candidates, described with reference to FIGS. 19, 20 and 21.

Figure 22:
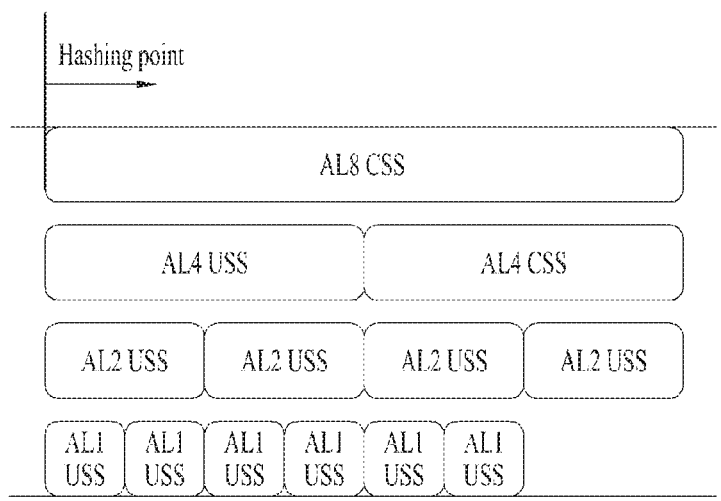

Referring to FIG. 22, although a hierarchical search space may be configured with one search space, the hierarchical search space may be configured with two or more search spaces (e.g., a common search space (CSS) or a UE-specific search space (USS)). In this case, a center PDCCH candidate serving as a hashing point of the hierarchical structure may be selected from among PDCCH candidates included in the CSS, thereby maximizing reuse of channel estimation which is an advantage of the hierarchical structure. Because the CSS is always blind-decoded, a PDCCH candidate included in the CSS is necessarily channel-estimated once. Therefore, channel estimation information about the CSS may be reused for the USS.

An environment using the search spaces and PDCCH formats defined in the current LTE-A is assumed. The length of a PDCCH candidate with the highest AL is 8 CCEs, and the other ALs are 4, 2 and 1. Thus, a total of 4 ALs are defined. In LTE, 2 PDCCH candidates are defined for AL 8, and 2, 6, and 6 PDCCH candidates are defined for ALs 4, 2, and 1, respectively.

According to an example, in the case where the hashing point of a PDCCH candidate with AL 8 is used as a reference in a hierarchical search space, a hashing point may be set by using a PDCCH candidate with AL 8 in the CSS. That is, the PDCCH candidate with AL 8 in the hierarchical search space may be set as the PDCCH candidate with AL 8 in the CSS. In this case, PDCCH candidates with lower ALs in the USS may be hierarchically arranged with respect to the hashing point of the PDCCH candidate with AL 8 in the CSS in the hierarchical search space. Because the PDCCH candidate with AL 8 in the CSS is first blind-decoded, channel estimation information from the blind decoding of AL 8 in the CSS may be reused for blind decoding of the PDCCH candidates with the lower ALs in the USS.

Hierarchical Structures According to the Symbol Number

When a CORESET composed of one symbol is allocated to a UE, a search space may be hierarchically configured with respect to the highest of ALs available in the CORESET. Alternatively, when the CORESET includes one symbol, it may be difficult to arrange a whole maximum search space available to the UE in the CORESET. Moreover, although a PDCCH candidate with the highest AL may be arranged in the CORESET including one symbol, it may be difficult to arrange the maximum search space in the CORESET due to lack of resources. That is, neither the whole search space for the UE nor the PDCCH candidate with the highest AL may be arranged in the CORESET including one symbol. In this case, the disposed search space may be hierarchically configured with respect to the starting point, that is, hashing point of the highest AL.

Figure 23:
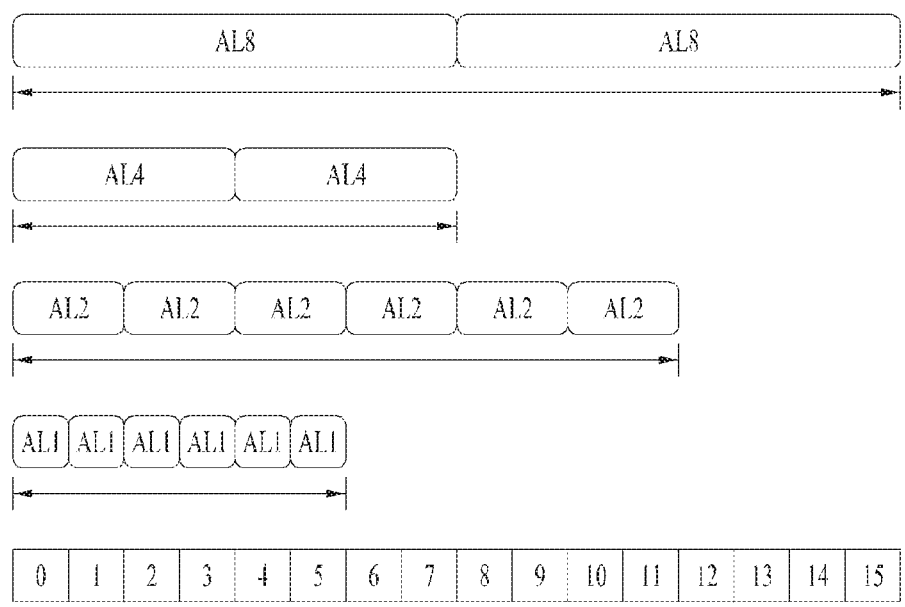
Figure 24:
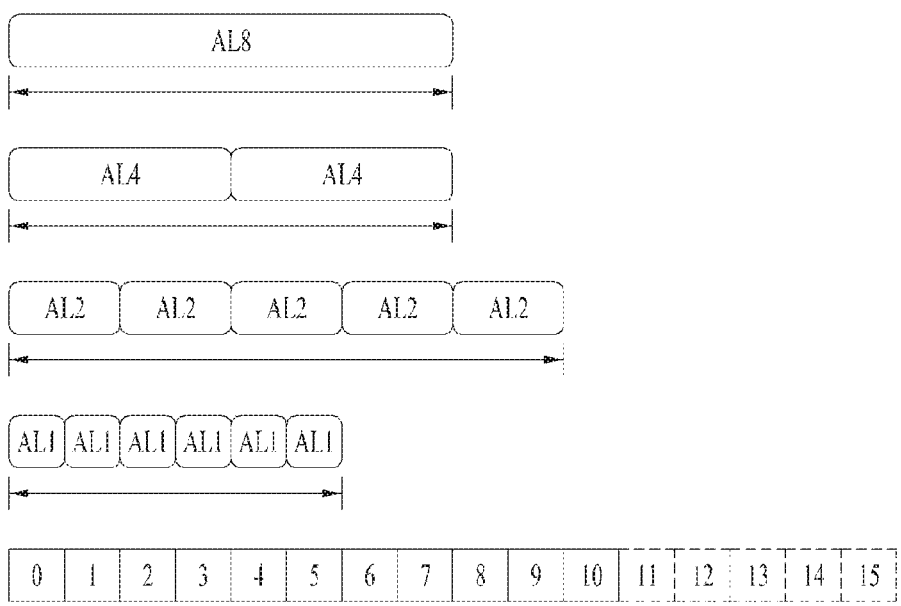
Figure 25:
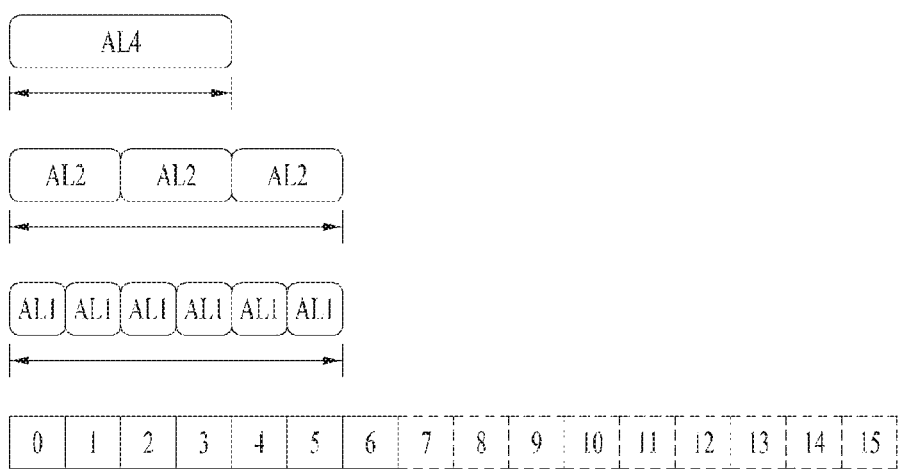

Referring to FIGS. 23, 24 and 25, when one symbol is allocated as a CORESET, a PDCCH candidate with a highest AL, AL8 or PDCCH candidates with up to AL4 may be allocated according to the resources of the CORESET. Further, although two PDCCH candidates may exists for AL 8, only one of the two PDCCH candidates with AL 8 may be arranged according to the resource state of the CORESET.

Figure 26:
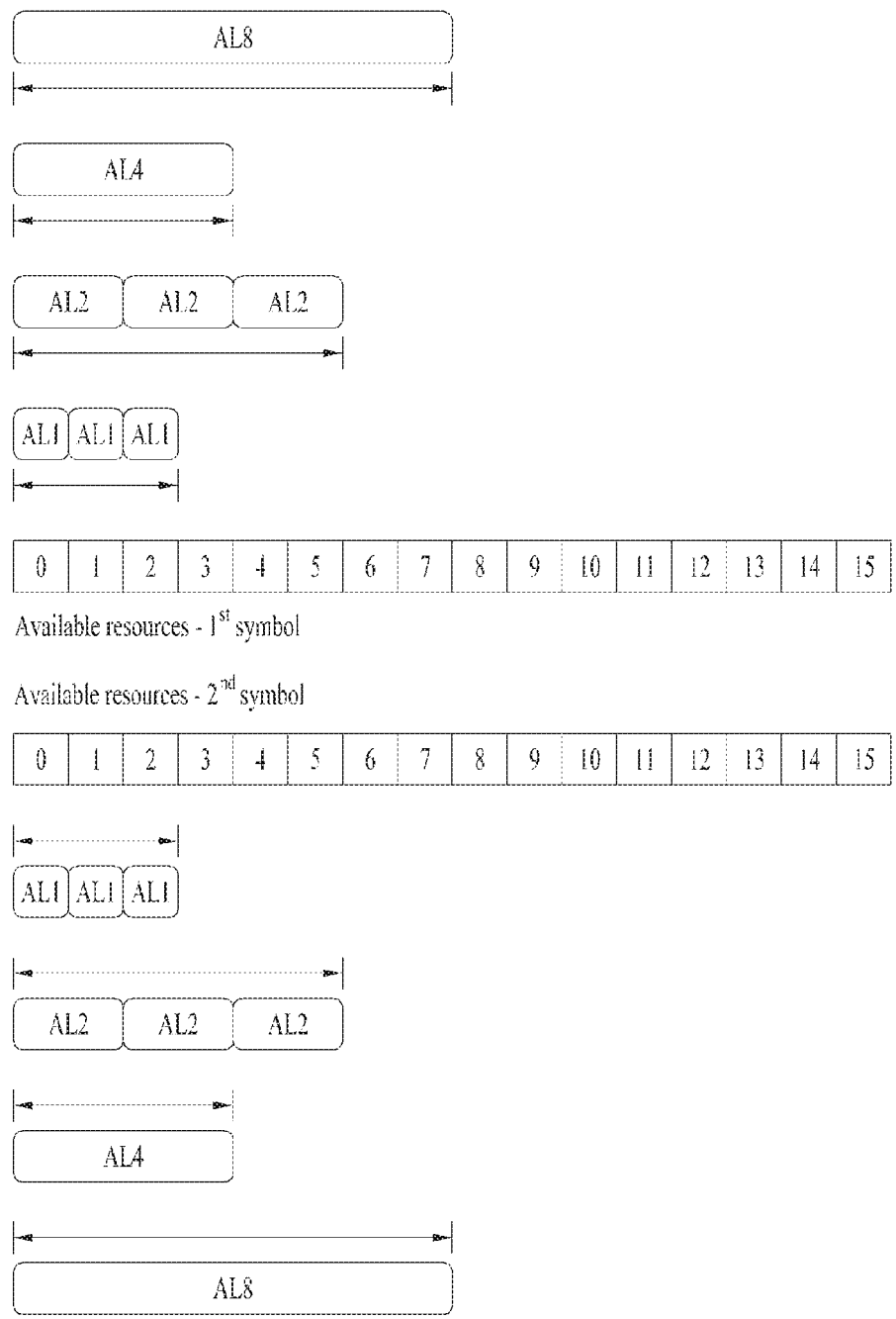

Referring to FIG. 26, when a CORESET including one or more symbols is allocated to a UE, a search space corresponding to the CORESET may be hierarchically configured based on a highest of ALs available in the CORESET.

According to an example, the search space may be divided into search space candidates for the respective symbols and arranged in the CORESET. In this case, the search space may include search space candidates, each being hierarchically configured based on the starting point (e.g., corresponding hashing point) of a PDCCH candidate with the highest AL among PDCCH candidates arranged in a corresponding symbol.

Alternatively, the search space candidates may be arranged asymmetrically in the symbols. Even though the CORESET includes a plurality of symbols, only a part of PDCCH candidates may be arranged due to resources insufficient for arrangement of the whole search space. In this case, a hierarchical structure may be constructed based on the start position of a PDCCH candidate with the highest Al among the PDCCH candidates arranged in each symbol.

Alternatively, one search space may be configured by combining the resources of symbols. For example, a PDCCH candidate with AL 8 may be constructed by using 4 CCEs in a first symbol and 4 CCEs in a second symbol. In this case, the 4 CCEs of each symbol may be considered to be a PDCCH candidate with AL 4, and a hierarchical structure may be configured based on the starting position (or hashing point) of the PDCCH candidate with AL 4 in each symbol.

An environment using the search spaces and PDCCH formats defined in the current LTE-A is assumed. The length of a PDCCH candidate with the highest AL is 8 CCEs, and the other ALs are 4, 2 and 1. Thus, a total of 4 ALs are defined. In LTE, 2 PDCCH candidates are defined for AL 8, and 2, 6, and 6 PDCCH candidates are defined for ALs 4, 2, and 1, respectively. It is assumed that a CORSET includes two symbols.

Referring to FIG. 26, PDCCH candidates may be distributed to the respective symbols, equally for each AL. One PDCCH candidate, one PDCCH candidate, three PDCCH candidates, and three PDCCH candidates may be arranged for AL 8, AL 4, AL2, and AL1, respectively in each symbol. Herein, a hierarchical structure may be configured based on the PDCCH candidate with AL 8.

Figure 27:
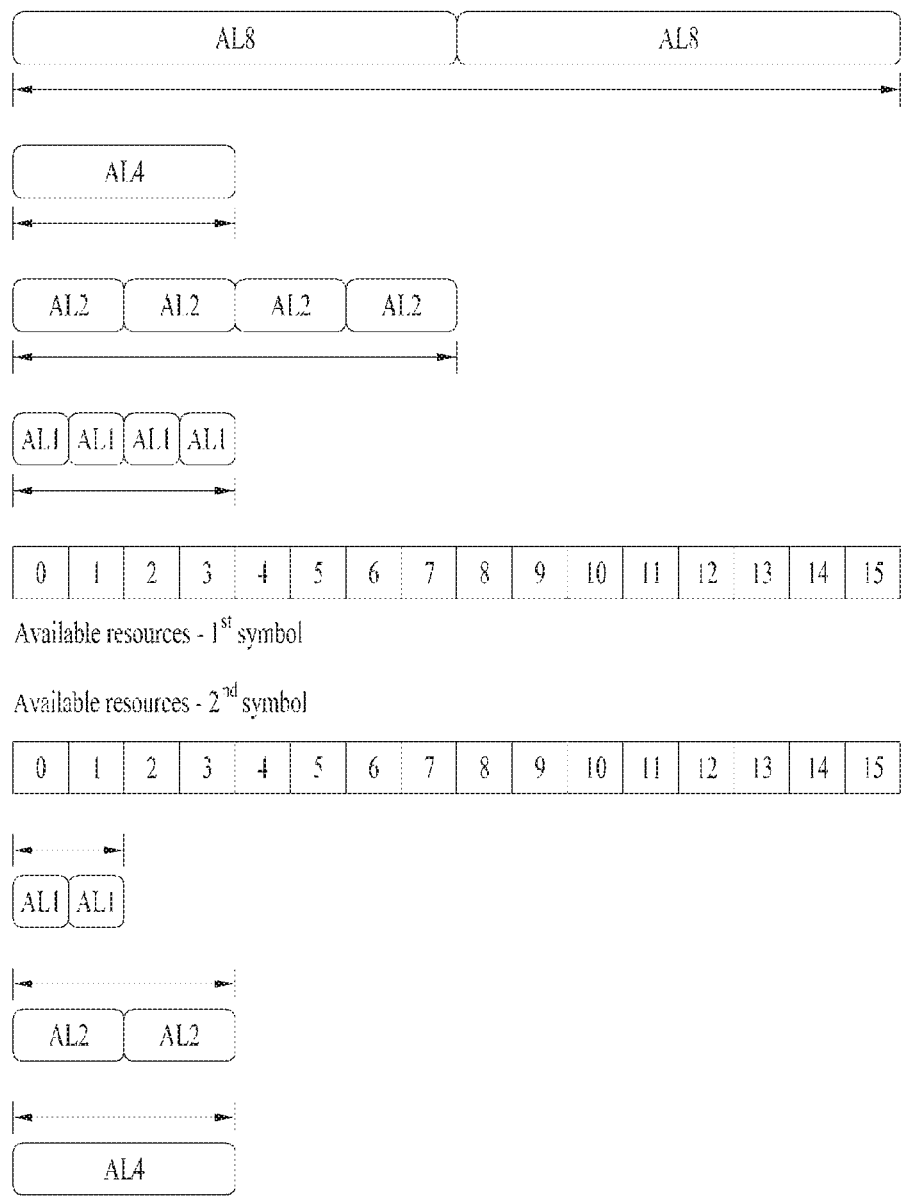
Figure 28:
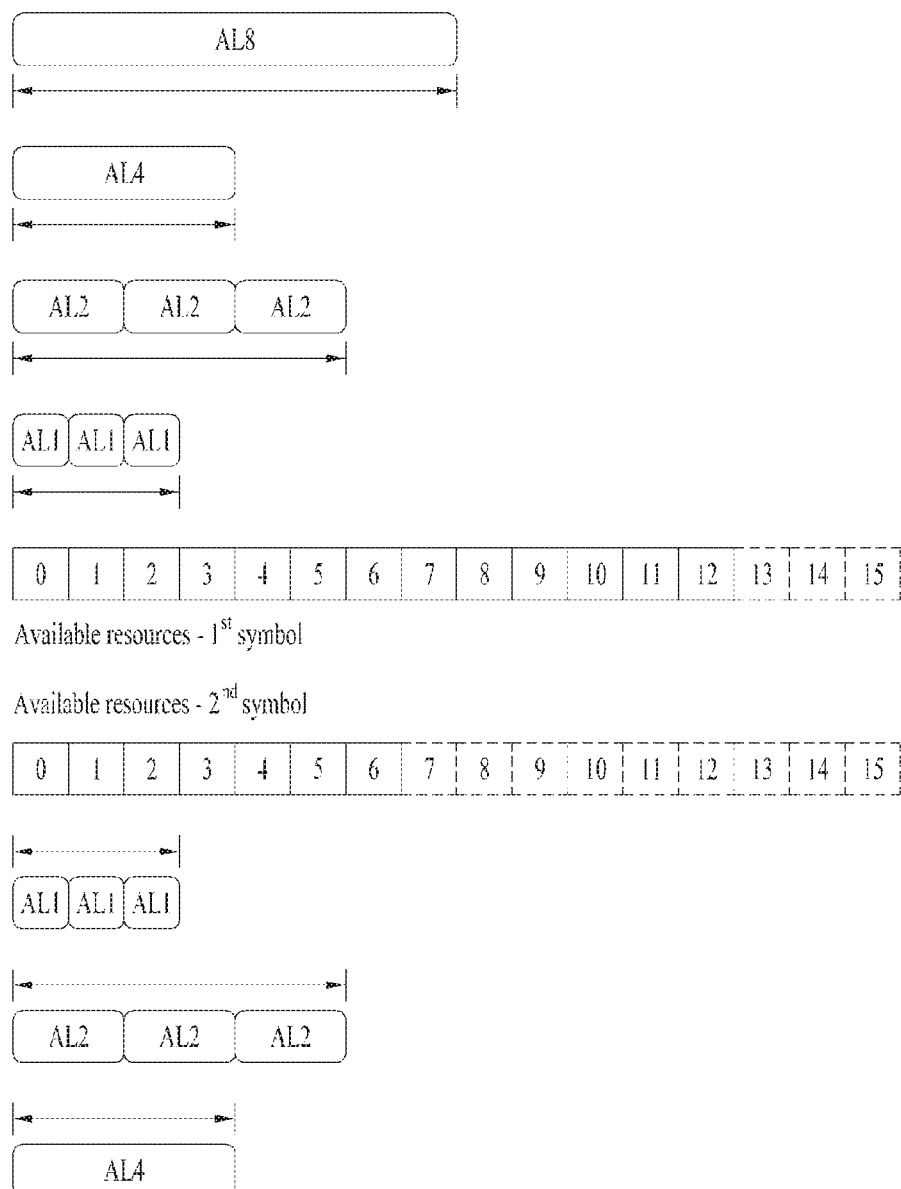

Referring to FIG. 27, while PDCCH candidates with AL 8 may be arranged in one symbol, PDCCH candidates may start with a PDCCH candidate with AL 4 in the other symbol. Then, a search space may be hierarchically configured based on a PDCCH candidate with AL 8 in the one symbol and based on a PDCCH candidate with AL 4 in the other symbol.

Referring to FIG. 29, two AL4 PDCH candidates each in one of two symbols may correspond to one PDCCH candidate with AL 8. In this case, a hierarchical structure may be constructed with PDCCH candidates in each symbol, based on the PDCCH candidate with AL 4.

In other words, a DL resource region received at a UE may include a plurality of CORESETs including resources in which a search space is disposed. That is, the DL control region may include a first CORESET and a second CORESET. The search space may be divided and separately disposed in the first and second CORESETs. That is, the search space may be divided into a first search space candidate included in the first CORESET and a second search space candidate included in the second CORESET.

As described before, the first search space candidate may include a first PDCCH candidate corresponding to a first AL and a second PDCCH candidate corresponding to a second AL, disposed within the first PDCCH candidate, and the second search space candidate may include a third PDCCH candidate corresponding to a third AL and a fourth PDCCH candidate corresponding to a fourth AL, disposed within the third PDCCH candidate. In this case, PDCCH candidates may be arranged overlappingly based on a PDCCH candidate corresponding to the highest AL in each search space candidate in the foregoing methods.

In this case, further, the numbers of PDCCH candidates included in the first search space candidate and the second search space candidate may be determined based on the numbers of symbols and available resources in the first CORESET and the second CORESET.

Further, the PDCCH candidate corresponding to the highest AL may be a PDCCH candidate in a CSS, and PDCCH candidates corresponding to the remaining lower ALs may be PDCCH candidates in a USS in the search space candidate. For example, in the first search space candidate of the first CORESET, the first PDCCH candidate may be a PDCCH candidate of the CSS, and the second PDCCH candidate may be a PDCCH candidate of the USS.

Virtual Highest AL

The present disclosure proposes methods of arranging PDCCH candidates with a plurality of ALs in a hierarchical structure. The basic approach is to include a PDCCH candidate with a lower AL in a PDCCH candidate with a higher AL, and the PDCCH candidates with the ALs need further definition. Even though ALs available for a CORESET are defined, all of the ALs are not configured for a UE. That is, even though ALs 1, 2, 4, and 8 are defined for a CORESET, the UE may be configured only with ALs 1, 2, and 4. Although the hierarchical structure of a search space may be designed for the UE based on the ALs configured for the CORESET, the hierarchical structure may also be designed with PDCCH candidates with the configured ALs for the UE.

Specifically, a highest AL serving as a reference in a hierarchical search space may be defined as at least one of "a highest AL configured for the CORESET with a non-zero PDCCH candidate", "a highest AL supported by the network (e.g., 8) which is fixed", or "an AL configured by the network to be used as a highest AL regardless of a CORSET configuration".

When a hierarchical structure is constructed, a search space is defined such that a PDCCH candidate with a lower AL is included in a PDCCH candidate with a higher AL. Therefore, PDCCH candidates with the remaining ALs except for the highest AL are arranged within the PDCCH candidate with the highest AL. In this case, the search space may be configured in a hierarchical structure based on a virtually defined AL, not the highest AL. A final hierarchical structure may not appear as a hierarchical structure, when the virtual AL is excluded. However, this configuration may lead to PDCCH candidates which are overlapped with each other within a predetermined range or which are appropriately separate from each other. In this case, efficiency of reuse of channel estimation which is the advantage of a hierarchical structure may be achieved, while the problem of blocking is overcome.

As described above, when a search space is configured hierarchically with PDCCH candidates with ALs configured for a UE, an eNB may provide information indicating that a virtual AL is not used actually to the UE, after even the virtual AL is configured for the UE. In this case, no problem is generated in using the search space at the UE. Indication information indicating which AL is a virtual AL may be signaled to the UE by RRC or higher-layer signaling.

An environment using the search spaces and PDCCH formats defined in the current LTE-A is assumed. The length of a PDCCH candidate for the highest AL is 8 CCEs, and the other ALs are 4, 2 and 1. Thus, a total of 4 ALs are defined. In LTE, 2 PDCCH candidates are defined for AL 8, and 2, 6, and 6 PDCCH candidates are defined for ALs 4, 2, and 1, respectively.

Figure 30:
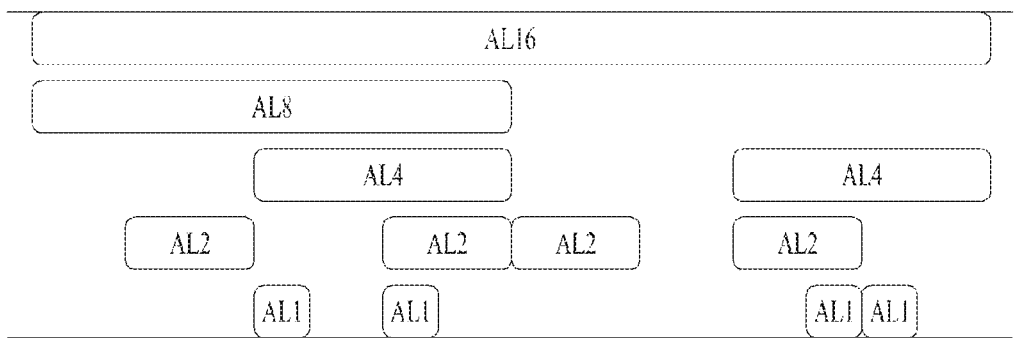

Referring to FIG. 30, the eNB may configure AL 16 as a virtual AL for the UE. On the assumption that there are two PDCCH candidates with virtual AL 16, a search space may be configured to include even virtual AL 16. The eNB may configure the UE with all of ALs 1, 2, 4, and 8. Herein, a hierarchical structure may be constructed by applying the afore-described various methods of constructing a hierarchical structure. For example, a PDCCH candidate with a lower AL may be distributed within a PDCCH candidate with a higher AL, in any of the afore-described methods. In this case, a hierarchical structure using the virtual AL may be applied as follows. The PDCCH candidates with AL 16 may be non-contiguously arranged, and the search space may be hierarchically configured on a PDCCH candidate basis. Further, configuration spaces for lower ALs which are configured together with each AL16 PDCCH candidate may be arranged non-uniformly. In this regard, one of two related hierarchical structures is illustrated in FIG. 30.

If resources occupied by a PDCCH candidate with the highest AL are not enough to cover the resources of PDCCH candidates with lower ALs, the method of defining a virtual AL and constructing a hierarchical structure based on a PDCCH candidate with the virtual AL has been proposed above.

In another method, an AL or PDCCH candidate to be monitored and an AL or PDCCH candidate with the AL, which is used to determine a hashing point may be defined separately. Information that distinguishes the two ALs or PDCCH candidates from each other may be signaled to the UE by RRC signaling. For example, if the UE is configured with one PDCCH candidate with AL 8, three PDCCH candidates with AL4, and PDCCH candidates with AU and AL2, at least all of the PDCCH candidates with AL 4 may not be covered by the single PDCCH candidate with AL 8. If an appropriate hierarchical structure is constructed by configuring a plurality of PDCCH candidates with AL 8 and indicating a PDCCH candidate to be monitored and a PDCCH candidate used to determine a hashing point among the PDCCH candidates, the number of PDCCH candidates to be monitored may not be increased, while the advantage of the hierarchical structure is still taken.

In another example, if the UE is configured with one PDCCH candidate with AL 4, three PDCCH candidates with AL 2, and a plurality of PDCCH candidates with AL 1 in a similar manner to the above method, the PDCCH candidate with AL 4 may first be defined to cover the PDCCH candidates with the lower ALs. However, a hierarchical structure may be constructed by defining AL 8 to determine a hashing point. Also, in this case, information indicating the usages of ALs and PDCCH candidates and distinguishing the ALs and the PDCCH candidates from each other may be transmitted by higher-layer signaling or RRC signaling. Therefore, although the UE does not monitor a PDCCH candidate with AL 8, the advantage of the hierarchical structure of the search space may be achieved.

In other words, when a search space is configured, PDCCH candidates with lower ALs may be arranged based on a virtual PDCCH candidate with a virtual AL. That is, each of the plurality of PDCCH candidates may fully or partially overlap with the virtual PDCCH candidate, and the virtual PDCCH candidate may be a PDCCH candidate corresponding to the virtual AL which is not monitored. In this case, the virtual AL may be set to be higher than the ALs of the plurality of PDCCH candidates which are actually included in the search space. For example, the virtual AL may be 16 and the length of the virtual PDCCH candidate may be 16 CCEs. In this case, the highest of the ALs of the plurality of PDCCH candidates actually included in the search space may be 8. In this case, PDCCH candidates with AL 8 may be arranged apart from each other within the virtual PDCCH candidate in the search space. The virtual PDCCH candidate and the virtual AL are not regarded as CCEs that the UE monitors to detect a PDCCH.

Application the Hierarchical Structure

When resources are allocated, PDCCH candidates which may be arranged in the resources may be configured hierarchically. That is, a hierarchical structure may also be applied to resource allocation for a PDSCH.

If a minimum unit of resources to be allocated is an REG or RBG, the size of the resources may be one or more REGs/RBGs. If an area available for resource allocation is defined as a resource candidate, a resource candidate may be defined for each resource size. Some resource candidates may be one REG/RBG in size, whereas other resource candidates may be multiple REGs/RBGs in size. In this case, when the position of each resource candidate is to be determined, the positions of resource candidates may be defined in a hierarchical structure.

Similarly to a hierarchical search space, a hierarchical structure may be constructed based on the position of a largest resource candidate. The position of the largest resource candidate may be defined in the same manner as resource allocations of resource allocation types 0, 1 and 2.

The position of a resource candidate of a second largest size may be defined within the range of the resource candidate of the largest size. The position of a resource candidate of a third largest size may be defined within the range of the resource candidate of the second largest size.

In the same manner, the positions of resource candidates of smaller sizes may be defined. There may be a plurality of resource candidates of the same size. The positions of these resource candidates of the same size may be defined within the range of resource candidates of a larger size. In this manner, all resource candidates may share at least one REG/RBG, and the method of constructing a hierarchical search space structure proposed in the present disclosure may be applied in the same manner to construct the hierarchical resource allocation structure.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a predefined signal (or a physical-layer or higher-layer signal) by an eNB.

Figure 31:
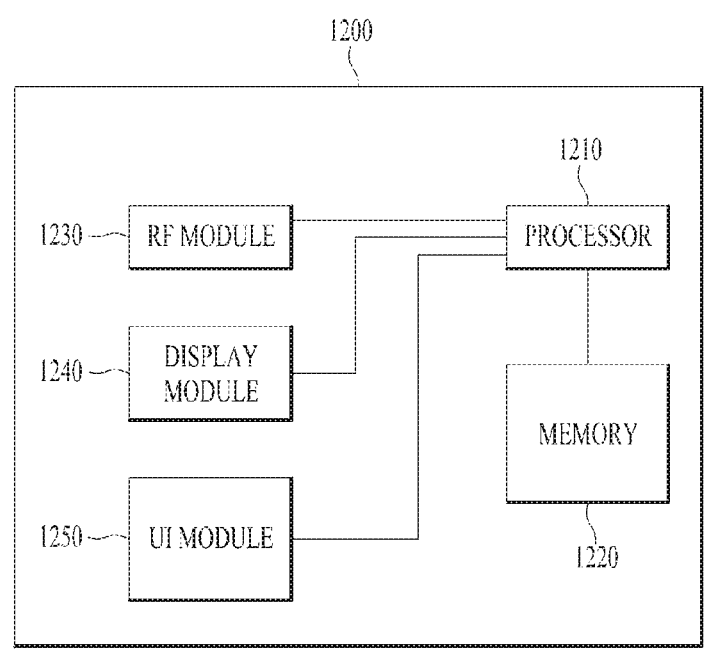
FIG. 31 is a block diagram illustrating a communication device according to an embodiment of the present disclosure.

Referring to FIG. 31, a communication device 1200 may include a processor 1210, a memory 1220, a Radio Frequency (RF) module 1230, a display module 1240, and a user interface module 1250.

Since the communication device 1200 is illustrated for convenience of description, some of the modules may be omitted. If necessary, other modules may be further included in the communication device 1200. In some cases, some modules may be divided into sub-modules. The processor 1210 may be configured to perform the operations in accordance with the embodiments of the present disclosure, which are illustrated with the accompanying drawings. The operations of the processor 1210 are described in detail above with reference to FIGS. 1 to 30.

The memory 1220 is connected to the processor 1210 and stores operating systems, applications, program codes, data, etc. The RF module 1230 is connected to the processor 1210 and converts a baseband signal into a radio signal or vice versa. To this end, the RF module 1230 performs analog conversion, amplification, filtering, and frequency up-conversion, or inverse procedures thereof. The display module 1240 is connected to the processor 1610 and displays various information. The display module 1240 may be implemented using well-known elements such as a Liquid Crystal Display (LCD), a Light Emitting Diode (LED), and an Organic Light Emitting Diode (OLED). However, it is not limited thereto. The user interface module 1250 is connected to the processor 1210 and may be implemented by combining well-known user interfaces such as a keypad, a touchscreen, etc.

Embodiments of the present disclosure have been described in the context of an LTE system, which should not be construed as limiting the present disclosure. Obviously, the present disclosure is also applicable to other communication systems such as 5G NewRAT. For example, even when resource information for URLLC and mMTC is indicated in a basic service mode such as eMBB, a combination of the above methods may be extended for application.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like.

Embodiments of the present disclosure can be implemented using various means. For instance, embodiments of the present disclosure can be implemented using hardware, firmware, software and/or any combinations thereof. In case of the implementation by hardware, a method according to each embodiment of the present disclosure can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present disclosure can be implemented by modules, procedures, and/or functions for performing the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made therein without departing from the spirit and scope of the disclosure. Therefore, the detailed description should not be interpreted restrictively in all aspects but considered as exemplary. Thus, it is intended that the present disclosure covers the modifications and variations of this disclosure that come within the scope of the appended claims and their equivalents.

INDUSTRIAL APPLICABILITY

The above-described embodiments of the present disclosure are applicable to various mobile communication systems.

What is claimed is:

1. A method of receiving a downlink control channel by a user equipment (UE) in a wireless communication system, the method comprising:
   receiving at least one symbol including a downlink control region; and
   performing blind decoding on a search space in the downlink control region,
   wherein the search space includes a plurality of physical downlink control channel (PDCCH) candidates, each of the plurality of PDCCH candidates related to an aggregation level and including a control channel element (CCE),
   wherein each of the plurality of PDCCH candidates overlaps with at least one PDCCH candidate, and
   wherein based on that a virtual aggregation level and a virtual PDCCH candidate related to the virtual aggregation level are used for configuration of the search space:
   each of the plurality of PDCCH candidates fully or partially overlaps with the virtual PDCCH candidate,
   the virtual aggregation level is configured to be higher than a highest of aggregation levels related to the plurality of PDCCH candidates,
   the virtual PDCCH candidate is a PDDCH candidate not to be monitored for the blind decoding, and
   (i) first information that the virtual aggregation level and the virtual PDCCH candidate are used for the configuration of the search space and (ii) second information that the virtual PDCCH candidate is not to be monitored for the blind decoding are received at the UE via higher layer signaling.

2. The method according to claim 1, wherein the plurality of PDCCH candidates include a first PDCCH candidate related to a first aggregation level, and a second PDCCH candidate related to a second aggregation level lower than the first aggregation level, and
   wherein the second PDCCH candidate is fully or partially included in the first PDCCH candidate.

3. The method according to claim 2, wherein the first aggregation level is the highest of aggregation levels related to the plurality of PDCCH candidates.

4. The method according to claim 2, wherein the first PDCCH candidate is a PDCCH candidate in a common search space, and the second PDCCH candidate is a PDCCH candidate in a UE-specific search space.

5. The method according to claim 2, wherein a second starting point which is a starting point of the second PDCCH candidate is determined randomly based on at least one of a first starting point which is a starting point of the first PDCCH candidate, the first aggregation level, or the second aggregation level, and
wherein the second starting point is different from the first starting point.

6. The method according to claim 2, wherein a remaining PDCCH candidate except for the first PDCCH candidate and the second PDCCH candidate among the plurality of PDCCH candidates is arranged to fully or partially overlap with the first PDCCH candidate.

7. The method according to claim 1, wherein the search space includes a first search space candidate and a second search space candidate which are separate from each other, and
wherein the first search space candidate includes a first PDCCH candidate related to a first aggregation level and a second PDCCH candidate arranged within the first PDCCH candidate and related to a second aggregation level lower than the first aggregation level, and
wherein the second search space candidate includes a third PDCCH candidate related to a third aggregation level and a fourth PDCCH candidate arranged within the third PDCCH candidate and related to a fourth aggregation level lower than the third aggregation level.

8. The method according to claim 7, wherein the first aggregation level is a highest of aggregation levels related to PDCCH candidates included in the first search space candidate, and the third aggregation level is a highest of aggregation levels related to PDCCH candidates included in the second search space candidate.

9. The method according to claim 7, wherein the downlink control region includes a first control resource set (CORESET) and a second CORESET, including resources in which the search space is arranged, and
wherein the first search space candidate is arranged in the first CORESET, and the second search space candidate is arranged in the second CORESET.

10. The method according to claim 9, wherein a number of PDCCH candidates included in each of the first search space candidate and the second search space candidate is determined based on a number of symbols and available resources in each of the first CORESET and the second CORESET.

11. The method according to claim 1, further comprising:
detecting downlink control information (DCI) based on a control channel element (CCE) detected by the blind decoding.

12. A user equipment (UE) for receiving a downlink control channel in a wireless communication system, the UE comprising:
at least one processor; and
at least one computer memory operably connectable to the at least one processor and storing instructions that, when executed by the at least one processor, perform operations comprising:
receiving at least one symbol including a downlink control region; and
performing blind decoding on a search space in the downlink control region,
wherein the search space includes a plurality of physical downlink control channel (PDCCH) candidates, each of the PDCCH candidates related to an aggregation level and including a control channel element (CCE),
wherein each of the plurality of PDCCH candidates overlaps with at least one PDCCH candidate, and
wherein based on that a virtual aggregation level and a virtual PDCCH candidate related to the virtual aggregation level are used for configuration of the search space:
each of the plurality of PDCCH candidates fully or partially overlaps with the virtual PDCCH candidate,
the virtual aggregation level is configured to be higher than a highest of aggregation levels related to the plurality of PDCCH candidates,
the virtual PDCCH candidate is a PDDCH candidate not to be monitored for the blind decoding, and
(i) first information that the virtual aggregation level and the virtual PDCCH candidate are used for the configuration of the search space and (ii) second information that the virtual PDCCH candidate is not to be monitored for the blind decoding are received at the UE via higher layer signaling.

13. The UE according to claim 12, wherein the UE is capable of communicating with at least one of another UE, a UE related to an autonomous driving vehicle, the base station or a network.

* * * * *